United States Patent
Schmidt et al.

(10) Patent No.: US 10,044,466 B2
(45) Date of Patent: Aug. 7, 2018

(54) SERVER-SIDE ADAPTIVE BIT RATE CONTROL FOR DLNA HTTP STREAMING CLIENTS

(71) Applicant: ARRIS Enterprises, Inc., Suwanee, GA (US)

(72) Inventors: Mark S. Schmidt, San Diego, CA (US); Praveen N. Moorthy, San Diego, CA (US); Baozhou Li, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 147 days.

(21) Appl. No.: 14/991,091

(22) Filed: Jan. 8, 2016

(65) Prior Publication Data
US 2016/0205164 A1 Jul. 14, 2016

Related U.S. Application Data

(60) Provisional application No. 62/100,934, filed on Jan. 8, 2015.

(51) Int. Cl.
*G06F 13/00* (2006.01)
*H04L 1/00* (2006.01)
(Continued)

(52) U.S. Cl.
CPC ........ *H04L 1/0001* (2013.01); *H04L 43/0864* (2013.01); *H04L 65/4069* (2013.01);
(Continued)

(58) Field of Classification Search
CPC ........... H04N 21/2402; H04N 21/6373; H04N 21/6379; H04N 21/64738; H04N 21/6583;
(Continued)

(56) References Cited

U.S. PATENT DOCUMENTS 7,299,280 B2 * 11/2007 Gerla ...................... H04L 29/06
709/224
8,150,995 B2 * 4/2012 Weston .................... H04L 47/10
709/221
(Continued)

FOREIGN PATENT DOCUMENTS

WO 02/093866 A2 11/2002

OTHER PUBLICATIONS

PCT Search Report & Written Opinion, Re: Application No. PCT/US2016/012655, dated May 9, 2016.

*Primary Examiner* — Kenneth R Coulter
(74) *Attorney, Agent, or Firm* — Thomas A. Ward

(57) ABSTRACT

Methods and systems are described for adaptively transmitting streaming data to a client. In one embodiment, the method comprises receiving, in a server, a request for a data asset from the client, transcoding at least a segment of the data asset according to initial transcoding parameters, transmitting a first fragment of the transcoded segment of the data asset from the server to the client over a communication channel, generating an estimate of a bandwidth of the communications channel at least in part from information acknowledging reception of at least the first fragment of the transcoded segment of the data asset by the client, generating adaptive transcoding parameters at least in part from an estimate of a bandwidth of the communications channel, the estimate generated at the server, transcoding a further segment of the data asset according to the adaptive transcoding parameters, and transmitting the further segment of the data asset.

18 Claims, 15 Drawing Sheets

(51) Int. Cl.
*H04L 12/26* (2006.01)
*H04L 29/06* (2006.01)
*H04N 21/2343* (2011.01)
*H04N 21/24* (2011.01)
*H04N 21/845* (2011.01)

(52) U.S. Cl.
CPC .......... *H04L 65/602* (2013.01); *H04L 65/607* (2013.01); *H04N 21/2343* (2013.01); *H04N 21/23439* (2013.01); *H04N 21/2402* (2013.01); *H04N 21/8456* (2013.01)

(58) Field of Classification Search
CPC ......... H04N 21/2343; H04N 21/23439; H04N 84/56; H04N 21/8456; H04L 47/25; H04L 1/0001; H04L 65/4069; H04L 65/607; H04L 65/602; H04L 43/0864
USPC ................ 709/231–234, 230, 217–219, 224; 370/468, 232
See application file for complete search history.

(56) References Cited

U.S. PATENT DOCUMENTS

| | | | |
|---|---|---|---|
| 9,462,021 B2 * | 10/2016 | Ramamurthy | H04L 65/60 |
| 9,548,936 B2 * | 1/2017 | Lee | H04L 47/28 |
| 9,769,235 B2 * | 9/2017 | Schmidt | H04L 65/607 |
| 2003/0149785 A1 * | 8/2003 | Gerla | H04L 29/06 709/232 |
| 2007/0076726 A1 * | 4/2007 | Weston | H04L 47/10 370/401 |
| 2012/0324123 A1 | 12/2012 | Fox et al. | |
| 2013/0044801 A1 | 2/2013 | Cote et al. | |
| 2013/0163428 A1 * | 6/2013 | Lee | H04L 47/28 370/235 |
| 2014/0089469 A1 * | 3/2014 | Ramamurthy | H04L 65/60 709/219 |
| 2014/0129825 A1 | 5/2014 | Losev et al. | |
| 2015/0381690 A1 * | 12/2015 | Schmidt | H04N 21/2343 709/231 |
| 2016/0381112 A1 * | 12/2016 | Ramamurthy | H04L 65/60 709/219 |
| 2017/0346874 A1 * | 11/2017 | Schmidt | H04N 21/2343 |

* cited by examiner

QUANTIZE THE BITRATE

```
Int BitrateQuantizer()
{
    double audioBitrate = 128.0; // 128Kbps audio. Can change to 64K.
    double esVideoVitrate = LoopOutput - audioBitrate;
    int temp = 0;
    int divisor = 0;

if (esVideoBitrate < 600.0) {
        divisor = 100;
    }
    else if (esVideoBitrate < 1200.0) {
        divisor = 200;
    }
    else {
        divisor = 300;
    } temp = RoundFloat(esVideoBitrate, divisor) * divisor;

// clamp the output between 200k and 3.5m
    temp = (temp > 3500) ? 3500: ((temp < 200) ? 200 :temp);

return temp;
}
```

*FIG. 12*

SERVER-SIDE ADAPTIVE BIT RATE CONTROL FOR DLNA HTTP STREAMING CLIENTS

CROSS-REFERENCE TO RELATED APPLICATIONS

This application claims benefit of U.S. Provisional Patent Application No. 62/100,934, entitled "SERVER-SIDE ADAPTIVE BIT RATE CONTROL FOR DLNA HTTP STREAMING CLIENTS," by Mark S. Schmidt, Praveen N Moorthy, and Baozhou Li, filed Jan. 8, 2015, which application is hereby incorporated by reference herein.

BACKGROUND

1. Field of the Invention

The present invention relates to systems and methods for adaptive bit encoding of digital media streams, and in particular to a system and method for server-side adaptive bit encoding of such streams.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of physical copies of the media programs to presentation locations such as theaters. Digital technologies have had a profound effect on the dissemination and playback of media programs.

In particular, digital technology (with improved bandwidth and improved compression/decompression techniques) has permitted the dissemination and playback of media programs via the Internet. These methods of dissemination and playback have become competitive with traditional means. Dissemination of media programs via the Internet may occur either by simple downloading, progressive downloading or streaming.

Simple downloading downloads the bytes of the media file in any convenient order, while progressive download downloads bytes at the beginning of a file and continues downloading the file sequentially and consecutively until the last byte. At any particular time during simple downloading, portions of the file will not be immediately available for playback because the entire file must be downloaded first before a media player can start playback.

With progressive downloading, a media file having the media program is downloaded via the Internet using dial-up, DSL, ADSL, cable, T1, or other high-speed connection. Such downloading is typically performed by a web server via the Internet. Media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server, and the web server does not make allowances for the data rate of the video file. For example, if the network bandwidth is lower than the data rate required by the video file, the user would have to wait a longer period of time before playback can begin, and may experience choppy "on and off" playback.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications, particularly not streaming applications.

Streaming delivers media content continuously to a media player and media playback occurs simultaneous with the delivery of the media content. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, can deliver just the amount of data necessary to play the video, at the rate needed to play it. Streaming media servers may also account for the transmission bandwidth and capabilities of the media player. Unlike the web server, the streaming media sever communicates with the client computer using control messages and data messages to adjust to changing network conditions as the video is played.

Although streaming media servers may use HTTP and TCP to deliver video streams, they generally use RTSP (real time streaming protocol) and UDP (user datagram protocol), because these protocols permit control messages and save bandwidth by reducing overhead. Unlike TCP, when data is dropped during transmission, UDP does not transmit resend requests. Instead, the server continues to send data.

Other streaming protocols that were developed primarily for mobile devices are also in use. One such protocol is the digital living network alliance (DLNA) streaming protocol, which is primarily used to stream media throughout the home. DLNA uses UPnP a model consisting of devices (network entities that provide services), services (which provide actions, such as playback) and control points (network entities that are capable of discovering and controlling other devices on the network.) DLNA extends the UPnP model so that devices can interact with one another to pass digital data, and control points configure devices as needed, initiates the flow of content, and thereafter relinquish control. DLNA uses HTTP for transport using the TCP/IP protocol. Accordingly, DLNA does not inherently support server-side adaptive bit rate control, even though the need for such adaptive bit rate control in such applications is often greater than it is for non-mobile devices.

Accordingly, there is a need in the art for a method and apparatus for server-side adaptive bit rate control in HLS and similar protocols. Described below is a method and apparatus that satisfies this need.

SUMMARY

To address the requirements described above, the present invention discloses a method and apparatus for adaptively transmitting streaming data to a client. In one embodiment, the method comprises receiving, in a server, a request for a data asset from the client, transcoding a portion of the data asset according to initial transcoding parameters, transmitting the transcoded a portion of the data asset from the server to the client over a communication channel, generating an estimate of a bandwidth of the communications channel at least in part from information acknowledging reception of the transcoded a portion of the data asset by the client wherein the bandwidth estimate is generated at least in part according to a round trip time (RTT) of the transmitted transcoded a portion of the data asset and a size of the transmitted transcoded at least a portion of the data asset, generating adaptive transcoding parameters at least in part from the estimate of the bandwidth of the communications channel, the estimate generated at the server, transcoding a temporally subsequent further portion of the data asset according to the adaptive transcoding parameters, and transmitting the further portion of the data asset from the server to the client. Another embodiment is evidenced by an apparatus comprising a processor communicatively coupled to a memory storing processor instructions for performing the foregoing operations.

BRIEF DESCRIPTION OF THE DRAWINGS

Referring now to the drawings in which like reference numbers represent corresponding parts throughout:

FIG. 12 is a diagram illustrating exemplary pseudocode to quantize the loop output;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A method and apparatus for server-side control of transcoder video and audio bit rate and resolution for delivery of continuous media streams over TCP/IP to players such as Digital Living Network Alliance (DLNA) client players using HTTP, is developed. The server application measures the network bandwidth available to the individual client for TCP/IP downloads of media and accordingly adjusts stream bit rate and composition to allow the client to retrieve the media stream with sufficient time margin to minimize the occurrence of underflow of client playback buffers. Embodiments include streaming over cellular (LTE, 3G) and WiFi networks to DLNA clients or Apple HTTP Live Streaming (HLS) clients provisioned with a DLNA-to-HLS conversion proxy.

Figure 1:
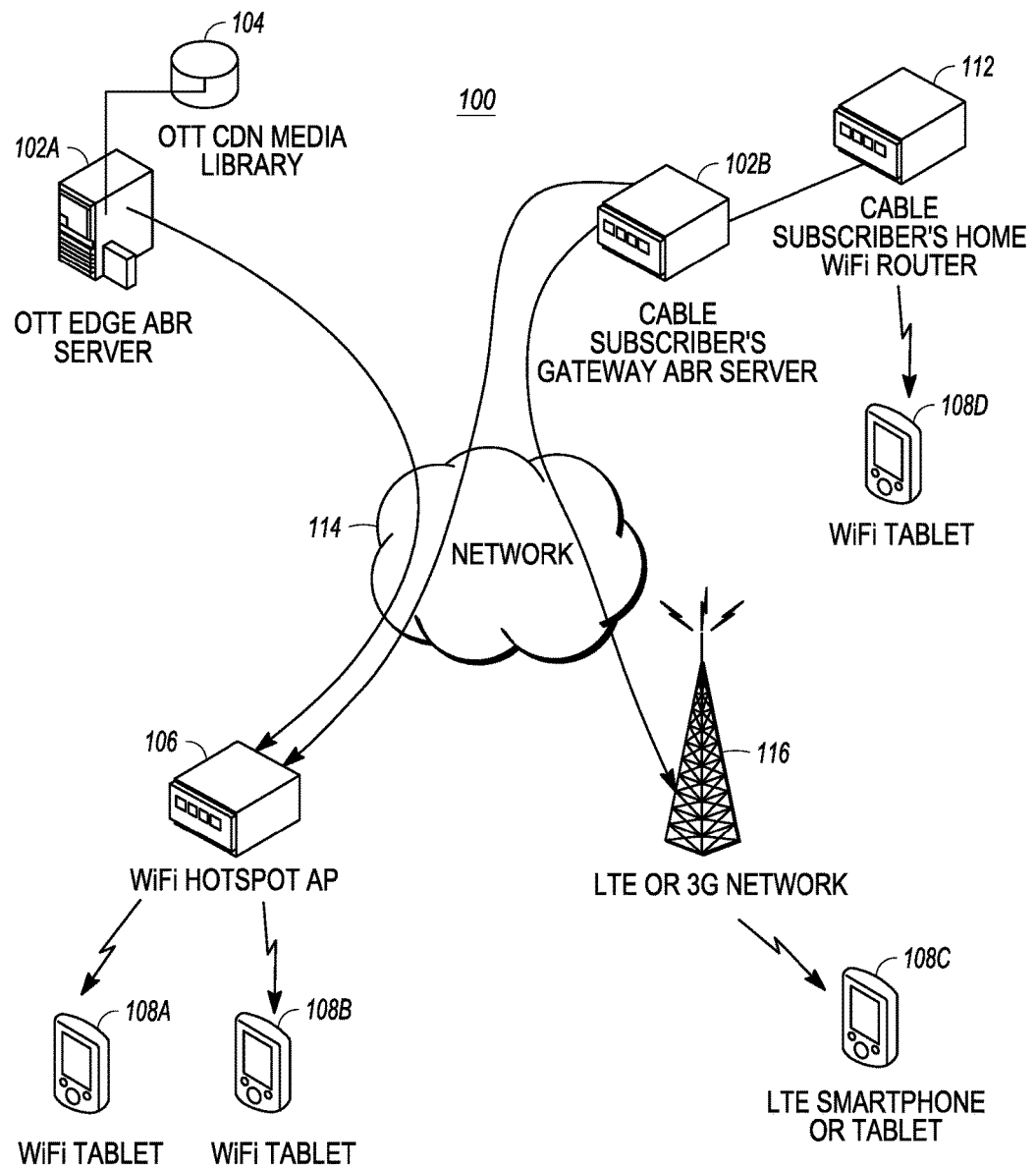
FIG. 1 is a diagram illustrating an exemplary architecture for server-side adaptive bit rate (ABR) control of a media streaming session.

FIG. 1 is a diagram illustrating an exemplary architecture 100 for server-side adaptive bit rate (ABR) control of a media streaming session. In the illustrated embodiment, the architecture 100 comprises an ABR server 102A that can be implemented in edge servers for over-the-top (OTT) delivery of cached media streams contained, for example, at content distribution network (CDN) storage servers 104. In one embodiment, the OTT edge ABR server 102 operates on mezzanine content which is media prepared at high quality and high bit rate which might not be suitable for delivery over bandwidth (BW) constrained networks. The ABR server may also be embodied by a consumer's gateway (GW) device 102B connected in their home to a cable, telco, satellite or other Internet protocol (IP) multiple-system operator (MSO) network operating on content processed. This subscriber gateway device 102B could have hard-disk drive (HDD) storage and/or digital video recorder (DVR) capability to receive, store, and retrieve content delivered over the MSO network for playback. The consumers GW device 102B would also provide ABR transcoding control for live tuned streams received from the MSO network.

Hereinafter, the OTT Edge ABR server and customer's GW ABR server may alternately be referred collectively as ABR server(s) 102.

In both of these example server-side embodiments, the ABR server 102 provides the media streams to wireless or wired clients 108A-108D (alternatively collectively referred to hereinafter as clients(s) 108) over bandwidth constrained IP networks such as the Internet 114. The media streams are transcoded or transrated by the ABR server 102 to fit the network bandwidth available to the client 108. The ABR server 102 measures this bandwidth as the clients 108 request and download media data using HTTP over TCP/IP. The clients 108 may be in the user or subscriber's home and retrieve content over the home WiFi network implemented by WiFi router 112 from the subscriber's cable gateway ABR server 102B or they may be remote and retrieve the content through the Internet via a WiFi hotspot 106 or LTE/3G cellular network 116 from the home gateway 102B or OTT ABR edge server 102A. The transcoded media streams may be encapsulated as MPEG-2 transport streams for delivery using HTTP over TCP/IP.

Importantly, the methods and systems described below differ from conventional adaptive bit rate schemes and standards currently in use to deliver media over IP. Protocols and standards such as MPEG Dynamic Adaptive Streaming over HTTP (DASH), Apple HTTP Live Streaming (HLS), Microsoft Smooth Streaming (MSS) or Adobe HTTP Dynamic Streaming (HDS) typically implement adaptation on the client side by requiring the streaming client to measure it's available received network bandwidth and choose a media stream of appropriate bit rate from a master playlist or manifest file containing multiple bit rate options (in HLS terminology a media playlist contains a list of uniform resource identifiers (URIs) that are addresses to media segments while a master playlist contains URIs that are addresses to media playlists). This often requires a storage network 104 or gateway 102B to create and maintain, in advance of the request for the media program many bit rate variants of a media asset. This can be a cost/complexity burden for low cost consumer gateway devices that may have only one, or a few, transcoder engine(s) that must be shared among multiple streaming clients. The systems and methods described below removes some or all of the control and bit-rate decision-making from the client-side and positions it on the server-side for just-in-time (JIT) creation of media streams that fit the available bandwidth to individual client devices. Only one transcoder instance is needed per client and, as well, server-side storage of multiple variants of a given media asset are replaced with the need for storing only one variant from which to make all JIT adaptive streams.

A prior implementation of server-side adaptation for media delivered over HTTP in chunked files (e.g., HLS) was disclosed in related U.S. patent application Ser. No. 14/750,097, entitled "SERVER SIDE ADAPTIVE BIT RATE CONTROL FOR HTTP STREAMING CLIENTS," by Mark S. Schmidt, Praveen N Moorthy, Ajay Luthra, and Paul Moroney, filed Jun. 25, 2015, which claims benefit of U.S. Provisional Patent Application No. 62/017,380, entitled "SERVER-SIDE ADAPTIVE BIT RATE CONTROL FOR HTTP STREAMING CLIENTS," by Mark S. Schmidt, Praveen N Moorthy, Ajay Luthra, and Paul Moroney, filed Jun. 26, 2014, both of which applications are hereby incorporated by reference herein. The implementation described here applies to continuous streaming of DLNA content over HTTP.

This disclosure also describes the development, analysis, testing and tradeoffs for a number of different algorithms for performing measurement of the bandwidth/throughput of a DLNA media stream by a Gateway server sending to a client over TCP/IP and performing transcoder control. The incorporation of a candidate measurement algorithm into the server-side ABR control algorithm and the control algorithm embodiment is also provided.

Figure 2:
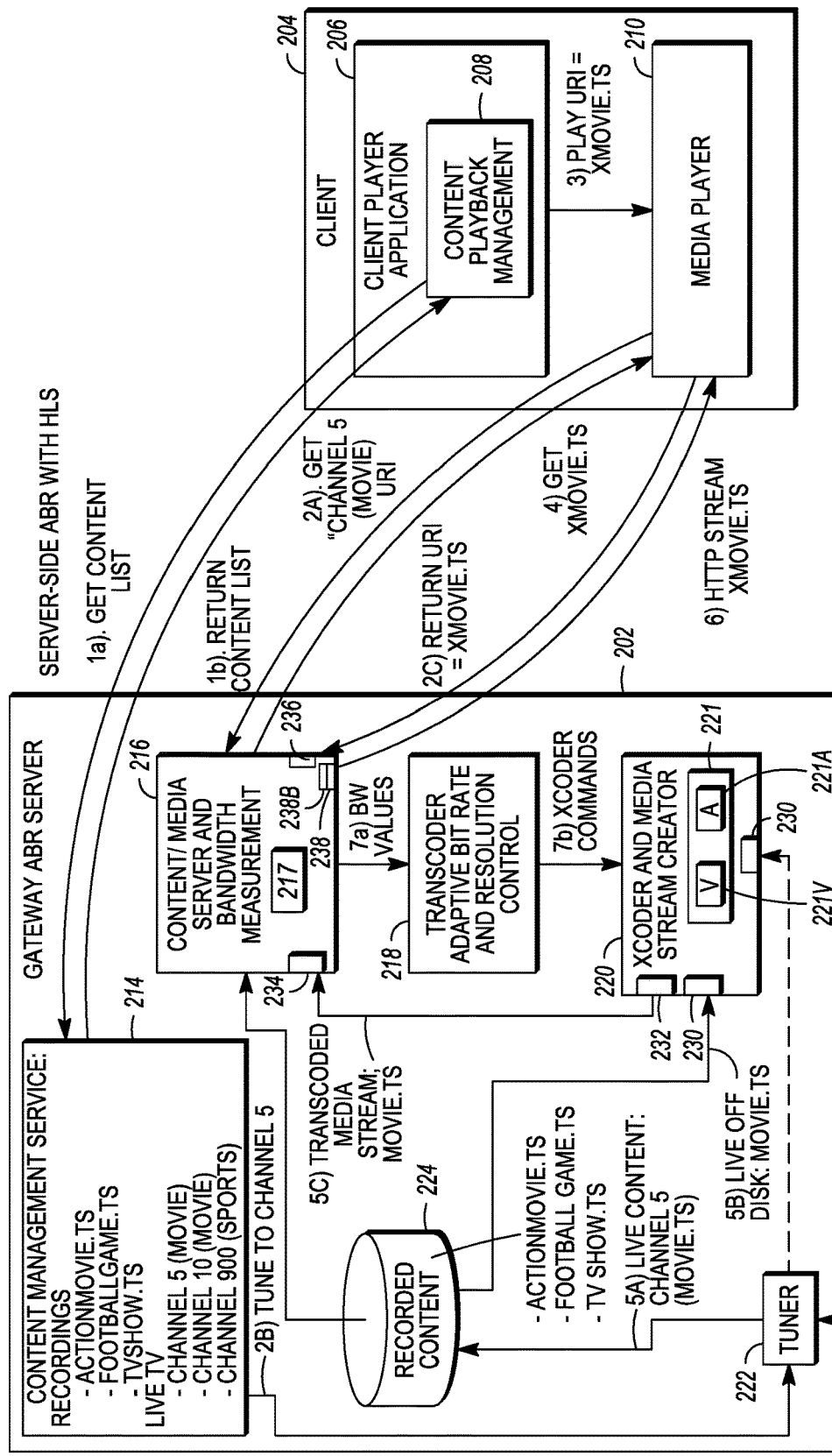
FIG. 2 is a diagram of an exemplary implementation of data streaming system comprising a DLNA ABR server and client system.

FIG. 2 is a diagram of an exemplary implementation of data streaming system 100 comprising an exemplary DLNA ABR server 202 and client system 204. This exemplary implementation is oriented to the DLNA protocol (DLNA compatible commands and messages are illustrated), however, the architecture and substantive information content in the commands and messages can also be applied to other protocols, such as HLS, DASH, MSS, or HDS, or any protocol in which client proxies convert the continuous media stream to chunked file formats.

In the illustrated embodiment, the ABR server 202 comprises a content server 216 that includes a bandwidth measurement module 217, transcoder rate/resolution controller 218, a transcoder/media stream creator 220 and one or more content sources (such as tuner 222 or DVR). The transcoder/media stream creator 220 may comprise that media transcoder 221 (alternatively referred to hereinafter as transcoder 221) that may include a video transcoder 221V and/or an audio transcoder 221A.

For the illustrated embodiment employing the DLNA protocol, the client 204 may be an ANDROID smartphone or tablet implementing a DLNA streaming client player application. Alternatively, an IPAD or IPHONE running the APPLE IOS AVPLAYER, could be used, but would require an application that proxies the continuous DLNA HTTP media stream and converts to the APPLE HLS format. The ABR server 202 is connected to the MSO content feed 225 in which a tuner 222 can be commanded to tune to a desired media channel of the MSO content feed 225. The tuner 222 may be a satellite or cable tuner, or in the case of a telephone company (TELCO) provider, a device that supports IP multicast join functionality. The content received by the tuner 222 may be transcoded live or recorded to a recording device such as a DVR for later transcoding. The content may also be transcoded and then stored on the recording device. The ABR server 202 and client interact as illustrated in FIG. 2 to provide ABR delivery of data streams.

In step 1a, a content playback management module 208 of a client player application 206 executing on the client 204 transmits a request for a content list to a content delivery service of the ABR server 202. The content list may include (as illustrated) a movie, a football game, a TV show, or a live television channel of the MSO content feed, for example, channel 5. In one embodiment, the client 204 retrieves the list of available content in the form of a channel map or recorded content delivery from a Content Management Service of the ABR server 202 using an HTTP "GET" command/function.

In step 1b, the client directory service 214 of the ABR server 202 may return the client 204 the content list. In one embodiment, the content list comprises an XML file. The client 204 receives the content list, and the content playback management module 208 of the client player application 206 processes and formats the information in the content list for presentation to the user of the client device 204, thus informing the user what media asset is available.

In step 2a, the user selects, using the client device 204, one of the media assets in the content list (e.g. live channel asset "Channel 5 (Movie)"), and requests (e.g. by transmitting a GET request) the content URI associated from the selected media asset from the ABR server 202. Each of the media assets are uniquely associated with a playlist needed for playback. In the example described further below, the user has selected a movie media asset that is associated with filename "xMovie.ts" of the playlist.

In step 2b, the receipt of the GET request triggers the ABR server 202 to tune the channel tuner 222 to tune to the requested channel (Channel 5).

In step 2c, the ABR server 202 creates a content streaming session URI. The content streaming session URI is the returned to the client 204. In this example, the content media file URI is named "xMovie.ts".

In step 3, the client 204 instantiates appropriate client media player application 206, with the xMovie.tx URI as a target for playback. The client media player 210 may be an object that is defined by the client 204 operating system to be usable to implement controllers and user interface for playing back single or multiple items.

In step 4, the media player 210 transmits a request for the selected data asset to the ABR server 202. In one embodiment, this is implemented by transmitting an HTTP GET request for the asset ("xMovie.ts") to the ABR server 202.

The reception of the GET URI request triggers the start of a transcoding session in the media stream creator module 220. The live tuner 222 sourced media stream may be sent directly to the transcoder 221 (as shown with the dashed line) and provided to transcoder input buffer 230 or may be first written to a hard-disk drive (HDD) 224 for Live-Off-Disk (LOD) functionality, as shown in step 5a, and then provided to the transcoder input buffer 230. In the latter case, the source content is then routed from the LOD memory 224 to the transcoder 221, as shown in step 5b.

The video transcoder 221V should be configured initially to produce a low bit rate and resolution, e.g., 500 kbps at 384×216 (horizontal×vertical pixel) resolution, given that the channel bandwidth characteristics to the client 204 are not yet known; alternatively, the transcoder 221 may reuse settings from a prior session with the client 204 or another client 204. The audio transcoder 221A may be set at a fixed format and bitrate (e.g., High Efficiency AAC at 64 kbps). The transcoder 221 output is sent to the Media Server 216 which pipes it to a TCP socket interface for delivery to the client 204, as shown in step 5c.

Upon receiving the "GET xMovie.ts" request of step 4, the Content Media Server and Bandwidth Measurement Module 216 initializes a bandwidth (BW) measurement function on the TCP socket that will be used for media delivery to the client 204. This measurement will be identified by a media session ID associated to the transcoding of asset xMovie.ts for the particular client 204. If the media stream creator 220 can produce a maximum of N simultaneous transcoded outputs from N source inputs, there may be up to N different media session IDs simultaneously created for N separate media client players 204.

As shown in step 6, the media player 210 of the client 204 retrieves the available media delivered over the TCP connection to its own internal TCP socket. The application can decode and render the retrieved media in real time and/or implement pause/seek functionality supported by the LOD feature on the ABR server 202.

In step 7a, as the xMovie.ts MPEG-2 transport stream is created by the transcoder 221 on the ABR server 202 and delivered through the TCP connection to the client 204, the BW measurement module 217 calculates the throughput of TCP segments over the network by monitoring information reported from a TCP socket status query, such as (1) the bytes remaining in the socket buffer at specific time intervals, (2) the times at which data was put in the socket buffer and when it was emptied, or (3) when the last TCP ACK was received by the socket as described further below.

In step 7b, the transcoder adaptive bitrate and resolution control module 218 makes dynamic changes to the video transcoder 221V bit rate and/or resolution commands based on the conditioned or filtered bandwidth measurements it receives from the BW measurement module 217.

In one embodiment, filtering of the bandwidth measurement is performed to reject spurious bandwidth measurement values. Typically, such filtering must be performed with low latency if responsive control of bitrate is desired. For example, if filtered BW values drop suddenly from temporally previous values (indicating, for example, network congestion or PHY layer packet loss due to channel errors), the transcoder bit rate will be reduced. If the filtered bandwidth estimates drop below a defined threshold, the ABR server 202 may be commanded to deliver just the audio component of the media asset (generated by audio transcoder 221A which typically requires only a 64 kbps maximum bit rate). If subsequently estimated BW values increase and remain above another threshold for a sufficient period of time or number of chunks, the adaptive bit rate and resolution controller 218 may command the transcoder and media segment creator 220 to transcode the segments at an increased bit rate that can be gradually further increased in temporally subsequent segments until the estimated BW measurements approach or exceed an upper threshold where it might be capped, if desired.

Steps 6 and 7 are iterated continuously throughout the media streaming session and client playback.

Bandwidth Measurement

The measurement of the throughput, goodput, or bandwidth (BW) (all equivalent terms used to describe channel capacity in this document) of a media stream delivered over TCP/IP can be performed in a number of ways but is highly dependent on the server application's media production and client application's media consumption implementation. It is desired to measure the TCP/IP network channel capacity between the ABR server 202 and client 204 in a timely and accurate manner so as to adapt the server's 202 media production bit rate (transcoder 221 bit rate) to the channel capacity allowing for delivery of the media stream without underflow or overflow of the client application buffer; the former results in stalled media decoding and presentation while the latter will result in dropped media content and hence, stuttered playback.

The media bit streams considered here are transcoded or encoded using video and audio compression algorithms such as MPEG-2, MPEG-4/AVC, or HEVC for video and Dolby AC-3, AAC-LC, or HE-AACv1/v2 for audio. The resulting elementary streams are multiplexed together and encapsulated in MPEG-2 transport stream (TS) for delivery to clients 204. It is well known that video compression algorithms can be performed using rate-control functions to yield high video quality variable bit rate (VBR) streams or varying video quality constant bit rate (CBR) streams, the former is useful for less constrained networks or media storage systems (e.g., BLURAY disk) and the latter is useful for constrained network delivery (e.g., fixed rate ADSL phone line Internet access). It is also well known that video compression algorithms use spatial and temporal prediction methods to exploit video redundancy for bit rate reduction by coding video into different picture types: Intra (I), temporally forward predicted (P), and bidirectionally (temporally forward and backward) predicted (B) pictures generally of decreasing size from I to P to B in coded bits. As a consequence, the transport bit rate of the transcoded stream can have large variations when measured over short time scales (10s to 100s of milliseconds).

Figure 3:
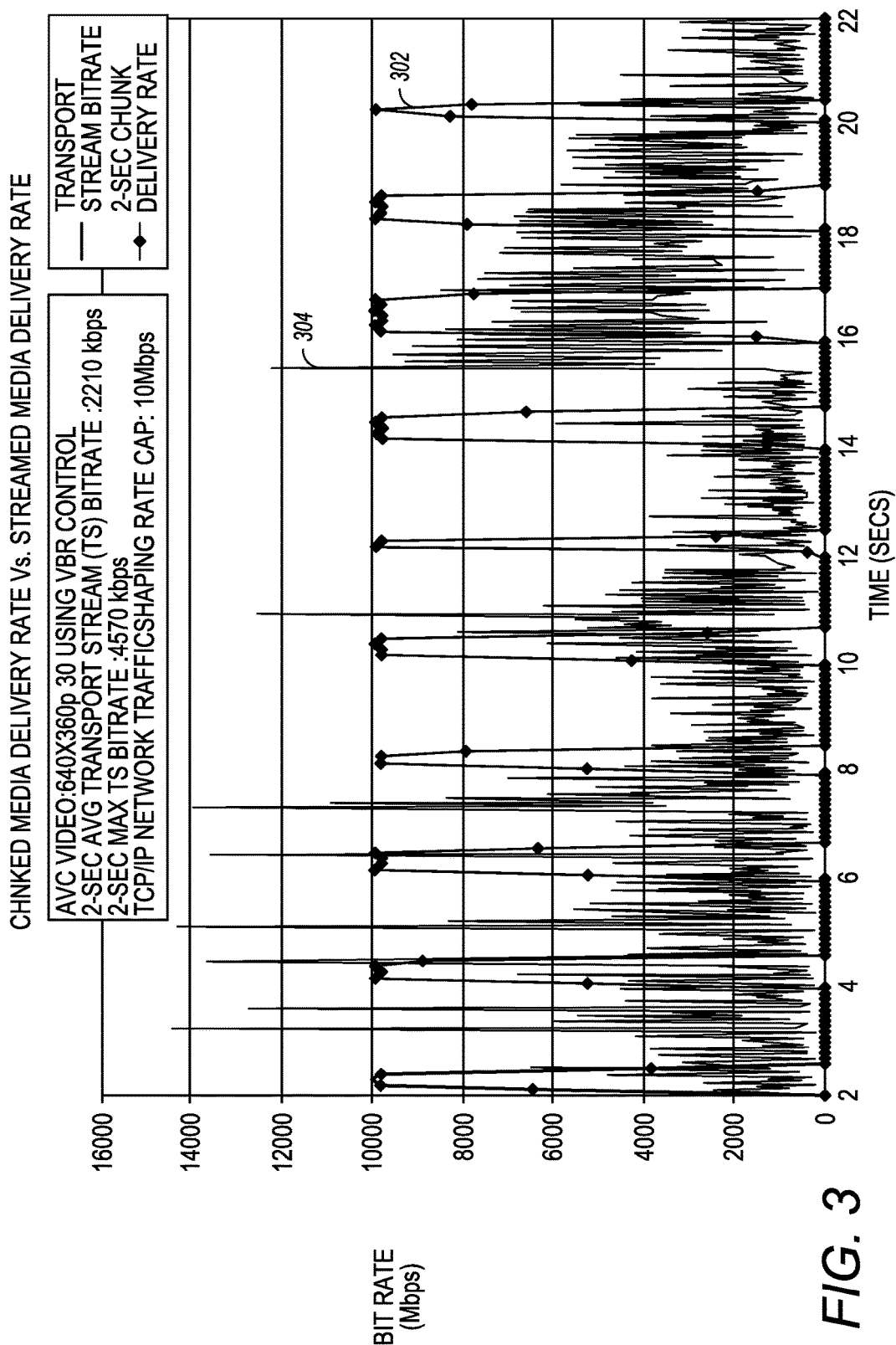
FIG. 3 illustrates the difference in instantaneous media or transport bit rate versus the bit rate of the same media sequence delivered using the HLS protocol.

FIG. 3 illustrates the difference in instantaneous media or transport bit rate versus the bit rate of the same media sequence delivered using the HLS protocol (which creates chunked media segments of 2 seconds, e.g., each in media duration). The HLS media asset files were pulled by the client over a TPC/IP network having a rate-shaping element in the network path set to limit the maximum throughput between client 204 and server 202 to 10 Mbps.

Plot 302 of FIG. 3 labeled "2-sec Chunk Delivery Rate" shows that the 2-sec chunks were pulled by the client at the (maximum) network bit rate of 10 Mbps. The media contained in those chunks was encoded using AVC compression with VBR rate control at a targeted video resolution of 640×360p30 and target average bit rate of 1.7 Mbps. Plot 304, labeled "Transport Stream Bitrate," represents the actual bit rate, and shows the MPEG-2 transport bitrate achieved every ⅟₃₀ of a second (matching the video frame rate). The data shown in FIG. 3 illustrates that some pictures, such as I pictures or scene-change P-pictures, demand very high instantaneous bit rates (up to 14 Mbps) that cannot be instantaneously delivered over the network constrained to 10 Mbps. If this transport stream had been delivered in a continuous manner instead of HLS chunks, then buffers in the server 202 and client 204 would be required to absorb the instantaneous peaks while the client application 206 pulled data at the media presentation rate. A 2-second sliding window average and maximum calculation of the transport stream bit rate yields an average of 2.21 Mbps and maximum of 4.570 Mbps over the displayed 2 to 22 second x-axis interval. It can be seen from FIG. 3 that the link could easily support a higher continuous transport bit rate during some intervals (12-14 secs, 20-22 secs) and on average easily supports the targeted VBR rate. However, a client-server system that utilized continuous TCP/IP streaming, such as DLNA and simulated by the "Transport Stream Bitrate" curve 304, would measure only the media bit rate and not the channel capacity when performed on a time scale quantization of a few picture intervals. Hence, it would be difficult to determine how to control the transcoder bit rate to take advantage of available bandwidth, while not exceeding the maximum available bandwidth.

The next sections present different methods for measuring the TCP/IP channel capacity for continuous media transport stream delivery used in the DLNA application.

Bandwidth Measurement at TCP Layer for DLNA Media Streaming

TCP Background and Prior Art Bandwidth Estimation

The TCP protocol provides for reliable, error-free delivery of data between TCP peers using:
ACKnowledgment of data sent and received using ordered sequence numbers of the bytes transferred
Retransmission of data that is lost (no ACK received)
Flow control that limits how many bytes can be in flight between sender and receiver using sliding receive window buffer at the receiver
Rate limiting congestion control at the sender that detects when the link is overloaded using a measurement of the transmission round-trip-time (RTT) and number/frequency of ACKed bytes to increase a congestion window Two basic modes of transfer occur in a TCP session: (1) slow-start and (2) congestion-control.

In the slow-start transfer mode, the sender exponentially increases the number of data segments, each of length up to the Maximum Segment Size (MSS) of the link, for each ACK received by the receiver, up to a slow-start-threshold (SSThresh) amount of segments. The number of unacknowledged segments allowed to be sent is called the congestion window (CWND). If no losses are detected, then when CWND reaches the SSThresh, the protocol transitions to the congestion-avoidance phase or congestion control mode, in which the number of segments transmitted increases by only one MSS every RTT for each ACK received. The increase in CWND occurs until a segment loss is detected (no ACK is received; this causes a lowering of the allowed segments in flight that have not been ACKed). Congestion avoidance results in a slow increase in the offered load by a sender to the network; eventually, the network cannot accept an ever-increasing load and will drop some packets from the sender. This results in a return to a decreased sender rate, either through return to full slow-start or in other modifications of TCP such as TCP Tahoe or Reno, where the sender pace is less reduced than a return to slow start.

Some of the TCP protocol parameters and measurements are available in typical Linux stack implementations through system calls that report back tcp_info data structure elements declared in the tcp.h header file:

```
struct tcp_info
{
        __u8 tcpi_state;
        __u8 tcpi_ca_state;
        __u8 tcpi_retransmits;
        __u8 tcpi_probes;
        __u8 tcpi_backoff;
        __u8 tcpi_options;
        __u8 tcpi_snd_wscale : 4, tcpi_rcv_wscale : 4;
        __u32 tcpi_rto;
        __u32 tcpi_ato;
        __u32 tcpi_snd_mss;
        __u32 tcpi_rcv_mss;
        __u32 tcpi_unacked;
        __u32 tcpi_sacked;
        __u32 tcpi_lost;
        __u32 tcpi_retrans;
        __u32 tcpi_fackets;
        /* Times. */
        __u32 tcpi_last_data_sent;
        __u32 tcpi_last_ack_sent;
        __u32 tcpi_last_data_recv;
        __u32 tcpi_last_ack_recv;
        /* Metrics. */
        __u32 tcpi_pmtu;
        __u32 tcpi_rcv_ssthresh;
        __u32 tcpi_rtt;
        __u32 tcpi_rttvar;
        __u32 tcpi_snd_ssthresh;
        __u32 tcpi_snd_cwnd;
        __u32 tcpi_advmss;
        __u32 tcpi_reordering;
        __u32 tcpi_rcv_rtt;
        __u32 tcpi_rcv_space;
        __u32 tcpi_total_retrans;
}
```

For example, CWND is reported as tcp_snd_cwnd, RTT estimates are reported as tcpi_rtt, tcpi_snd_mss gives the sender side MSS. The parameters tcpi_last_data_sent and tcpi_last_ack_recv are also of interest below; tcpi_last_ data_sent gives the time difference from the current call to read tcp_info to the time the last TCP segment was sent out of the TCP socket buffer towards the receiver; tcpi_last_ack_recv gives the time difference from the current call to tcpinfo to the time the last ACK was received from the receiver.

An example of a well-known TCP throughput measurement is used in the iproute2 ss utility of Linux:

$$BW=(tcpi\_snd\_mss*tcpi\_snd\_cwnd)(8\ bits/byte)/tcpi\_rtt\ bits/sec \quad \text{Eqn. (1)}$$

The assumption here is that the TCP sender is releasing CWND segments of MSS bytes in length every RTT seconds, i.e., when in congestion avoidance, the sender will have CWND segments in flight that are not yet acknowledged but expected to be ACKed within RTT seconds assuming no loss of segments. For example, for typical Ethernet MSS=1448 bytes, if CWND has grown to 40 segments while the current RTT measurement is 22 msecs, then $$BW=(40*1448)*(8\ bits/bytes)/(0.022\ secs)=21.06\ Mbps$$

Unfortunately, in actual TCP operation, equation (1) above is found to be inaccurate due to overbounding induced by:
- using a fixed MSS (some or many transmitted segments may not contain a full MSS bytes);
- the observation that, although TCP may drive CWND to large values such as 20 to 50, sometimes there will not be enough sender data per unit time to send CWND unacknowledged segments through the link; and
- the measurement of RTT has variance and latency.

Figure 4:
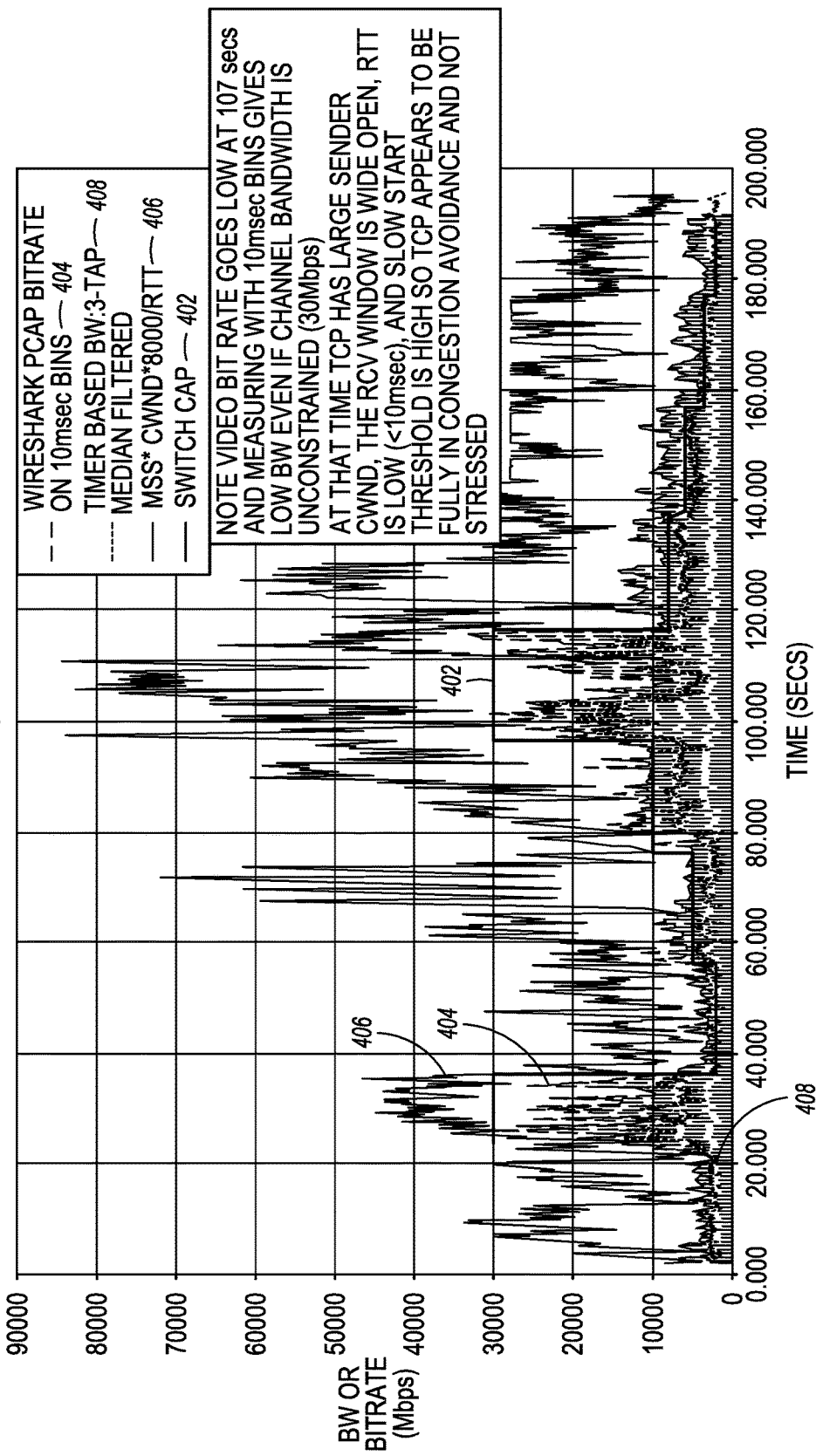
FIG. 4 is a diagram illustrating DLNA timer-based bandwidth measurements.

This is illustrated in FIG. 4 in which a network is constrained by a traffic rate shaping device to only allow throughputs at the maximum shown in the "Switch Cap" curve 402. Delivered TCP bit rate is measured using a Wireshark capture analysis. Plot 404 ("Wireshark pcap bitrate on 10 msec bins") shows the actual traffic approximating the switch cap bounds. Plot 406 ("mss*cwnd*8000/rtt"), shows that the estimate of the bandwidth according to Equation (1) is significantly above the network "Switch Cap" limit shown in plot 402. Plot 408 illustrates the timer-based bandwidth, as filtered by a 3-tap median filter.

To ameliorate this problem, new bandwidth estimate paradigms were explored. These new bandwidth estimate techniques yield results more accurate than those of Equation (1) and can be made on temporally short intervals to allow timely update of transcoder 221 output bit rate to match the network capacity.

The next sections describe throughput (bandwidth) measurement algorithms, designed and tested for their applicability for DLNA media streaming, based on:
- Examination of tcp_info parameters such as tcpi_snd_cwnd and tcpi_rtt (hereinafter referred to as "TCPInfo Algorithm")
- The TCP ACK-based measurement using libpcap that was applied to chunked media files described in related U.S. patent application Ser. No. 14/750,097 and U.S. Provisional Patent Application No. 62/017,380 described above. This algorithm is hereinafter termed as the "Libpcap Algorithm."
- Grouping sender data into larger blocks at the application layer before releasing to the TCP socket similar to the HLS example of FIG. 3 (hereinafter referred to as the "Bunching Algorithm")
- Using periodic timer expirations to trigger examination of the number of socket bytes sent and number of socket bytes remaining (hereinafter referred to as "Timer-Based Algorithm")
- Using the tcpi_last_ack_recv, socket bytes sent and socket bytes remaining (hereinafter referred to as "Last_ACK_Recv_Algorithm")

Before describing the measurement algorithms in detail, a brief description of the Gateway DLNA streaming implementation is provided to understand the constraints the bandwidth measurements were made under.

Gateway DLNA Transcoding and TCP Streaming Implementation

The Gateway ABR server 202 depicted in the block diagram of FIG. 2 shows a tuner 222 and hard-disk drive 224 interfacing directly to the transcoder and media stream creator 220. This might suggest that the bytes of a continuous MPEG-2 transport stream flow into the transcoder 221 and back out to the TCP socket. In actual implementation, the transcoder 221 includes both input and output buffers, that buffer both data entering the transcoder and the transcoded data leaving the transcoder. These buffers reduce the load on the CPU of the server 202 that is used to process the stream (for example, for encryption). These buffers fill at the input and output media stream bit rates and must be emptied periodically to prevent overflow.

In the embodiments described below, a timer termed "AFTimer" expiring on 120 msec intervals, is used to notify software elements that the transcoder output buffer, termed "recpump," has data and can be emptied for processing by the server 216. For the ABR measurement and control algorithm, the AFTimer interval also serves as the notification interval to make throughput measurements and decisions about changing the rate and resolution of the transcoding performed by the video transcoder 221V.

This I/O buffering scheme has the consequence of imparting a short-interval (120 msec) burstiness to the transcoded DLNA stream delivered to the Linux TCP stack and hence to the client 204. This burstiness is not comparable to that used in HLS or DASH in which media segments are often 2 to 10 secs in duration. Since 120 msecs equates to roughly 4 video frames of data at 30 fps, this short interval still produces a TCP stream that closely follows the media bitrate and does not resemble the HLS chunk delivery of FIG. 3.

For low bit rate media streams and high capacity networks between the Gateway ABR server 202 and client 204, it is often observed that the data in the transcoder output buffer (recpump) can be processed and delivered over the TCP network between AFTimer expirations; that is, it takes less than 120 msecs to send the amount of data delivered by the transcoder to the output buffer (recpump) in 120 msecs. When the network or communication channel is congested or lossy, it can take longer than one AFTimer interval to deliver the output buffer (recpump) data to the client and the output buffer (recpump) fills further with new media data from the transcoder 221. These two observations are used extensively in the measurement algorithms implemented and described below.

TCPInfo Algorithm

Since the Linux TCP stack on a gateway server 202 exposes some of the TCP protocol parameters such as CWND (tcp_snd_cwnd) and RTT (tcpi_rtt), it was conjectured that by analyzing or monitoring these variables, information about the TCP throughput could be deduced. For example, if the throughput of the link is high then it might be expected that the congestion window (determined by tcp_snd_cwnd) would be large and if it was low, it might be due to congestion, with the resulting retransmits causing tcpi_rtt to be large and tcp_snd_cwnd to be small. Thus, the transcoder bit rate could be driven up or down based on the values returned in these parameters.

A test was done to stress a DLNA media streaming link between a gateway server 202 and iPad WiFi client 204 by passing the stream through an Ethernet switch that had port rate shaping enabled to dynamically limit the maximum data throughput (bitrate) out of a given port. The gateway 202 DLNA socket sender software was modified to get the socket info through a LINUX getsockopt call which returned the data of the tcp_info structure.

Figure 5:
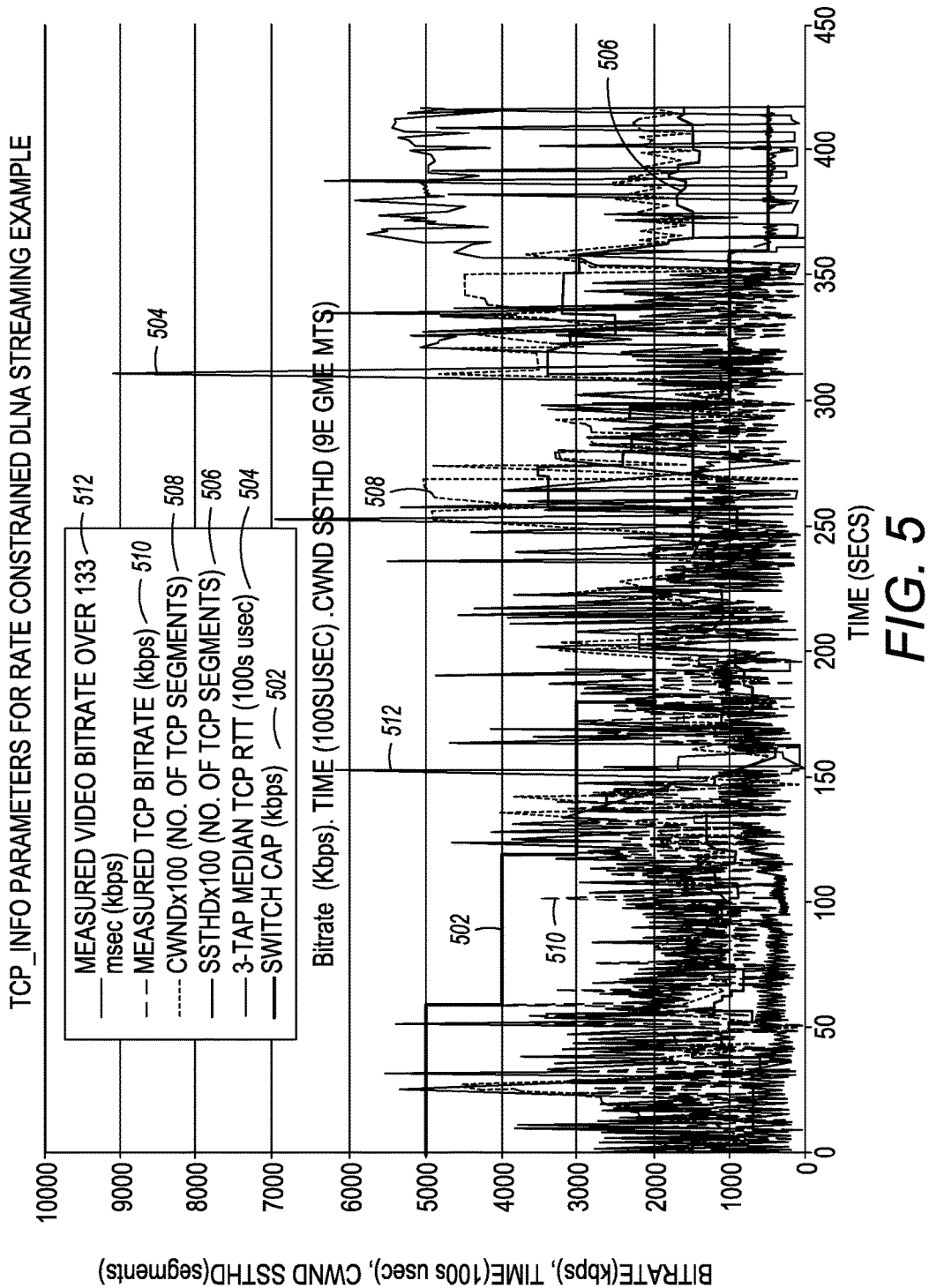
FIG. 5 is a diagram showing the result, including TCP information parameters plotted against a dynamically changing switch rate cap.

FIG. 5 is a diagram showing the result, including TCP information parameters plotted against a dynamically changing switch rate cap, in which the link throughput was lowered in consecutive steps, to see how the parameters behaved when the TCP link was rate limited and stressed. Plot 512 ("Measured Video Bitrate") represents the media transport stream bit rate for the audio/video (AN) DLNA stream as measured using the average over consecutive 133 msec intervals (or 4 frames of video at 30 fps). The video resolution was 384×216p30 and the overall TS bitrate for the stream had a target of 900 kbps. Plot 510 ("Measured TCP Bit Rate") shows a 3-tap median filtered measurement of the DLNA bit rate delivered to the client device through the rate shaping switch.

Each measurement before filtering is made at the 120 msec AF timer interval described above. Plot 502 ("Switch Cap") shows the maximum bitrate allowed over the link by the port shaping function of the Ethernet switch; the rate cap was lowered from 5 Mbps at the start of the test to 500 kbps in a series of steps. It can be seen that the "Measured TCP Bit Rate" (plot 510) becomes equal to the rate cap at 500 kbps when the load of the streaming media (900 kbps) offered for transport exceeds the rate cap. At that point the A/V presentation was stalling and stuttering during client playback since the media was not being delivered at its production rate.

Plot 506 of FIG. 5 shows the slow-start threshold in TCP segments, plot 508 shows the CWND in segments, both scaled by 100 to fit the graph), and plot 504 shows the TCP RTT (scaled to be represented in 100s of μsecs) all as reported in tcp_info structure by the Gateway 202 Linux TCP stack.

Some of the TCP parameters might be useful as indications of TCP throughput or link stress. For example, TCP RTT (plot 504) definitely increases as the switch rate cap decreases indicating that segments are being delayed in their delivery to the client 204 over the overloaded network. However, CWND (plot 508) actually grows as the network capacity decreases. For example, when the switch cap (plot 502) is 500 kbps, CWND is 20×MSS=20×1448 bytes and RTT 50 msecs. Applying these values to Equation 1 would yield a throughput estimate of 4.63 Mbps which is again not an accurate estimate of the actual throughput. A final observation is that SSThd seems to correlate well with CWND.

Libpcap Algorithm

The "Libpcap" throughput measurement algorithm basically measures the time interval between TCP ACK messages returned by the client to the TCP stack of the gateway ABR server 202. The difference in sequence numbers between the two ACK messages is typically the number of successfully sent bytes so, together with the local timestamps that "Libpcap" puts on the received ACK messages, the network throughput can be estimated.

This works well for media delivered in the HLS "chunk" format where a series of media files are downloaded at the network capacity and Libpcap can measure this capacity during each download. However, for the DLNA streaming embodiment, the ACK-based estimates can still lead to an estimate of the media bit rate instead of the channel capacity as illustrated earlier in FIG. 3. This happens because the Libpcap method used a sampling interval of the time delta between ACK messages (e.g., 100 or 250 msecs). As noted earlier, the data from the transcoder output buffer (recpump) is often delivered well within the AFTimer interval for high network capacities. Thus, the libpcap-measured time deltas between ACK messages can overlap a large (up to 120 msecs) dead time in which no data was transitioning over the TCP connection from the server 202 to the client 204. This has the effect of averaging the libpcap measurements to a value that approximates the media stream bit rate and not channel capacity or throughput.

The libpcap algorithm needs modification for operation with the DLNA streaming implementation at the Gateway server 202. In one embodiment, this can be accomplished by detecting (filtering) and timestamping the sequence number of each TCP segment as it leaves the TCP stack of the Gateway ABR server 202 and detecting (filtering) and timestamping the ACK message received from the client 204 corresponding to that segment, then accumulating the elapsed times and numbers of bytes sent before making a throughput calculation.

For example if $SN_0$ represents the initial sequence number of bytes sent at the start of a measurement, $SN_f$ represents the final sequence number of a measurement, $\Delta T_{SN(i)}$ represents the time difference from when the ACK for the $i^{th}$ segment is received and the time that $SN_i$ leaves the sender, then the bandwidth BW may be estimated according to Equation (2) below $$BW = \frac{(SN_f - SN_0)8}{\sum_{i=0}^{f} \Delta T_{SN(i)}} \text{ bps} \qquad \text{Eqn. (2)}$$

Bunching Algorithm

The "bunching" algorithm alters the continuous streaming in the typical DLNA media transfer described above into a bursty delivery mechanism similar to HLS and DASH. By holding the transponder output buffer (recpump) data for a given time duration or until a certain size of media has been accumulated, and then releasing this data in a "bunch" to the TCP socket of the server 202, the data may flow at the network channel capacity in a manner similar to the "2-sec Chunk Delivery Rate" curve 302 of FIG. 3.

The bunching algorithm measures bandwidth or throughput after the burst of bunched data has emptied from the send socket buffer 238b of the Gateway TCP 202. This algorithm proceeds as follows:

Every 120 msec AFTimer recpump notification interval, the bunching algorithm accumulates the signaled transponder output buffer 232 (recpump) data block worth of bytes into a bunching buffer 234. When this value exceeds a threshold, e.g., 128 Kbytes (131072 bytes), the algorithm releases the bunched buffer 234 of data to the TCP send socket 238. Note that this may take multiple 120 msec timer intervals to accumulate during which no new data is released to the socket 238. Note also that the bunching algorithm imposes a large CPU loading in moving data from transcoder output buffer 232 to a special buffer 234 for bunching.

After the bunched data are released to the socket, a Linux ioctl call (SIOCOUTQ) is made every subsequent AFTimer interval, which returns the bytes remaining (bytesRemaining) in the socket buffer 238. When bytesRemaining=0, the TCP socket buffer 238 is empty and all TCP segments have been transmitted to the TCP receive client 204 (but possibly not yet acknowledged by a ACK message transmitted by the receive client 204). In other words, the transmitted segments may be in flight, might get lost, and might need retransmission for reliable reception.

The time at which the SIOCOUTQ call is made that results in bytesRemaining=0 can be determined by a Linux system time call as $T_f$. This time is equal to a multiple of the transcoder output buffer 232 (recpump) AFTimer interval of $T_{AF}$=120 msecs since the algorithm is invoked only on those intervals. The time at which the 128 kByte data bunch was delivered to the socket can be denoted $T_0$. Then an estimate of when the last TCP segment of the 128 KByte data bunch had been sent out over the socket to the client is $$\text{elapsedTime} = \Delta T = T_f - T_0 \qquad \text{Eqn. (3)}$$

Note that $\Delta T$ is quantized to $T_{AF}$ values so there will be error in the bandwidth estimate. For example, if the last TCP segment were delivered 5 msecs after an AFTimer notification, bytesRemaining=0 would not be detected until 115 msecs later at the next AFTimer notification interval when the algorithm is again invoked. This results in a 115 msec error in DT.

The tcp_info variable tcpi_last_data_sent was also used in one of the trial measurement algorithms here in an attempt to improve the elapsedTime measurement. This variable returns the time delta from when the call was made to when the last TCP data segment was sent out of the TCP send socket buffer 238b. The time at which the call is made can be determined by a Linux system time call as $T_f$ again equal to a multiple of the recpump AFTimer interval of $T_{AF}$=120 msecs. Then an estimate of when the last TCP segment of the 128 kByte data bunch had been sent out over the socket to the client is:

$$\text{elapsedTime} = \Delta T = (T_f - \text{tcpi\_last\_data\_sent}) - T_0 \qquad \text{Eqn. (4)}$$

Here if the last TCP segment was delivered 5 msec after AFTimer notification, the next AFTimer notification would yield bytesRemaining=0 and tcpi_last_data_sent=115 msecs. The resulting DT calculation would now more accurately reflect the time to send 128 kBytes of data.

Note that alternatively, the time at which bytesRemaining went to zero could be determined by a rapid polling by the algorithm of the SIOCOUTQ function. This would increase CPU utilization but is explored in a different BW measurement implementation, as described below.

The calculation for throughput is then made when bytesRemaining=0 at an AFTimer notification interval, using the formula:

$$BW = (131072 \text{ bytes})(8 \text{ bits/byte})/\Delta T \qquad \text{Eqn. (5)}$$

Table I shows the effects on BW calculation due to the time quantization of Equation (3) in which elapsedTime is measured and calculated to 120 msecs quanta. The calculation of Equation (5) is shown for different bunch sizes of N=131072, 65536 and 32768 bytes and different numbers of AFTimer intervals over which the possible bytesRemaining=0 would result in BW values of interest.

Note that for smaller bunch sizes, a high network throughput in which all bunched data bytes leave the socket in one AFTimer interval results in maximum BW values of 8.738 Mbps, 4.369 Mbps, and 2.184 Mbps for N=131072, 65536, and 32768 bytes, respectively. Thus, if the true network BW exceeded these values the algorithm would return measurements that were too low. Conversely, if the network bandwidth were very low (for example, 500 kbps) it would take >2 secs to deliver N=131072 bytes over the network. Hence, a BW measurement would take >2 secs to complete and the transcoder bitrate control algorithm would have a long delay before correcting the output to a suitable rate for the network BW. Thus, a fixed value of bunched data size, N, could be problematic for transcoder bitrate feedback control.

TABLE I

Bunch Bitrate Calculation Quantization Based on Equation (3)

| No. of AFTimer Intervals in Measurement | Time Delta, $\Delta T$ (secs) | BW Calculation for Bunch Size N Bytes (kbps) | | |
|---|---|---|---|---|
| | | N = 131072 | N = 65536 | N = 32768 |
| 1 | 0.12 | 8738.13 | 4369.07 | 2184.53 |
| 2 | 0.24 | 4369.07 | 2184.53 | 1092.27 |
| 3 | 0.36 | 2912.71 | 1456.36 | 728.18 |
| 4 | 0.48 | 2184.53 | 1092.27 | 546.13 |
| 5 | 0.60 | 1747.63 | 873.81 | 436.91 |
| 6 | 0.72 | 1456.36 | 728.18 | 364.09 |
| 7 | 0.84 | 1248.30 | 624.15 | 312.08 |
| 8 | 0.96 | 1092.27 | 546.13 | 273.07 |
| 9 | 1.08 | 970.90 | 485.45 | 242.73 |
| 10 | 1.20 | 873.81 | 436.91 | 218.45 |
| 11 | 1.32 | 794.38 | 397.19 | 198.59 |
| 12 | 1.44 | 728.18 | 364.09 | 182.04 |
| 13 | 1.56 | 672.16 | 336.08 | 168.04 |
| 14 | 1.68 | 624.15 | 312.08 | 156.04 |
| 15 | 1.80 | 582.54 | 291.27 | 145.64 |
| 16 | 1.92 | 546.13 | 273.07 | 136.53 |
| 17 | 2.04 | 514.01 | 257.00 | 128.50 |
| 18 | 2.16 | 485.45 | 242.73 | 121.36 |
| 19 | 2.28 | 459.90 | 229.95 | 114.98 |
| 20 | 2.40 | 436.91 | 218.45 | 109.23 |
| 21 | 2.52 | 416.10 | 208.05 | 104.03 |

Table II shows the time it takes for N bytes to be created for an MPEG-2 transport stream at a given bit rate. This will determine the real-time bunching intervals. For example, at 864 kbps, it takes the real-time transcoder 1.214 secs to produce a bunched data block of 131072 bytes. This will determine the minimum algorithm update interval from the production side.

TABLE II

Time to Accumulate N Bytes for Various MPEG-2 TS Bitrates

| TS Bitrate (kbps) | Time to accumulate N bytes at different bit rates (secs) | | |
|---|---|---|---|
| | N = 131072 | N = 65536 | N = 32768 |
| 264 | 3.972 | 1.986 | 0.993 |
| 464 | 2.260 | 1.130 | 0.565 |
| 664 | 1.579 | 0.790 | 0.395 |
| 864 | 1.214 | 0.607 | 0.303 |
| 1064 | 0.986 | 0.493 | 0.246 |

TABLE II-continued

Time to Accumulate N Bytes for Various MPEG-2 TS Bitrates

| TS Bitrate (kbps) | Time to accumulate N bytes at different bit rates (secs) | | |
|---|---|---|---|
| | N = 131072 | N = 65536 | N = 32768 |
| 1264 | 0.830 | 0.415 | 0.207 |
| 1464 | 0.716 | 0.358 | 0.179 |
| 1664 | 0.630 | 0.315 | 0.158 |
| 1864 | 0.563 | 0.281 | 0.141 |
| 2064 | 0.508 | 0.254 | 0.127 |
| 2264 | 0.463 | 0.232 | 0.116 |
| 2464 | 0.426 | 0.213 | 0.106 |
| 2664 | 0.394 | 0.197 | 0.098 |
| 2864 | 0.366 | 0.183 | 0.092 |
| 3064 | 0.342 | 0.171 | 0.086 |
| 3264 | 0.321 | 0.161 | 0.080 |
| 3464 | 0.303 | 0.151 | 0.076 |
| 3664 | 0.286 | 0.143 | 0.072 |
| 3864 | 0.271 | 0.136 | 0.068 |
| 4064 | 0.258 | 0.129 | 0.065 |
| 4264 | 0.246 | 0.123 | 0.061 |

The ΔT measurement based on Eqn. (4) yielded better BW estimates although still with some inaccuracies. A test was performed using 384×216p30 VBR AVC video plus 128 kbps AAC-LC audio having aggregate average TS bitrate of about 900 kbps. The DLNA stream was sent over an unconstrained WiFi network and the measurements using Equations (3), (4), and (5) were plotted against the actual data throughput calculated from Wireshark network capture of the TCP/IP data stream using TCP ACK message data from the client 204.

Figure 6:
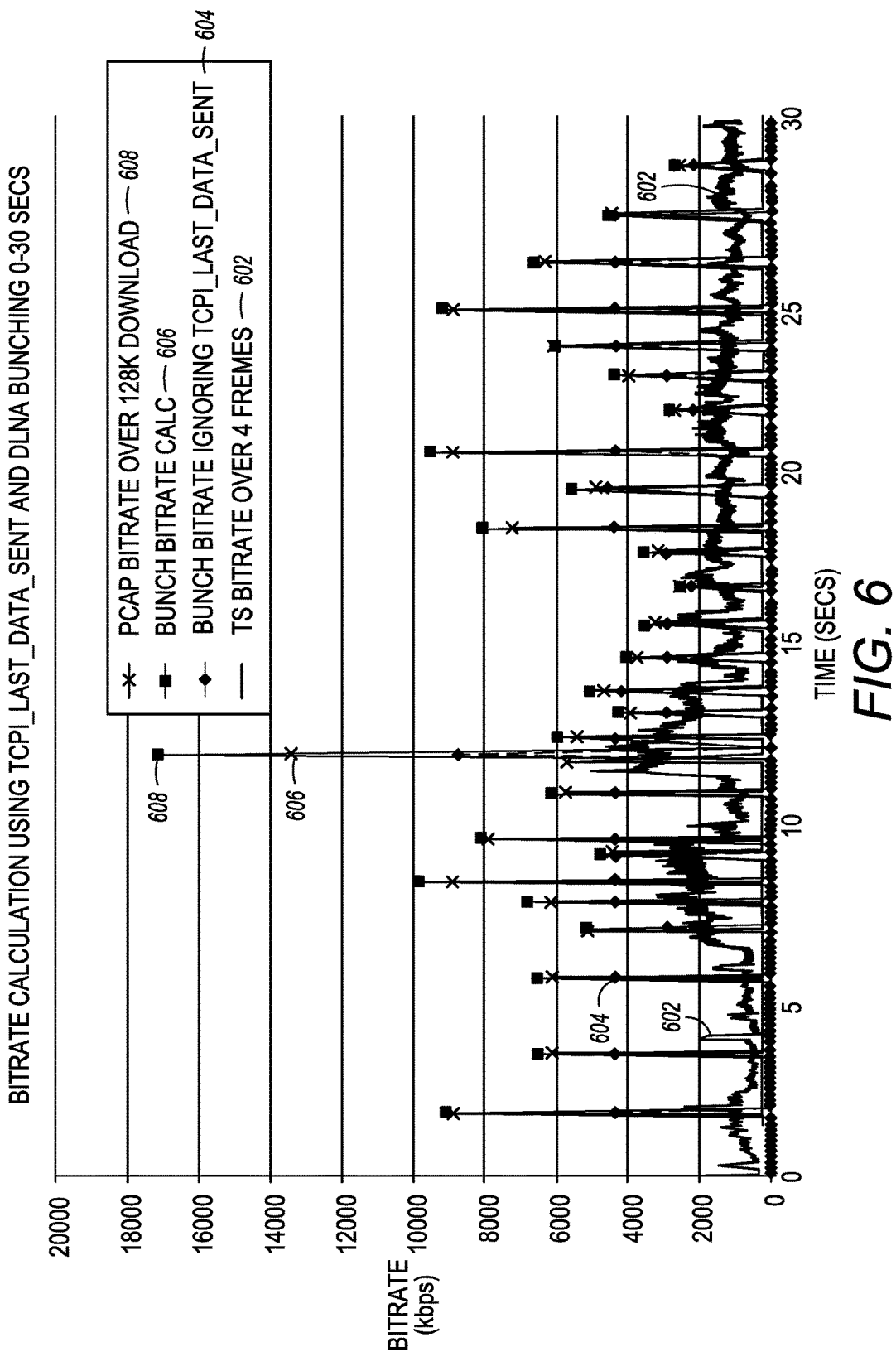
FIG. 6 is a diagram illustrating the result of a study comparing bitrate calculations using last data sent information and DLNA bunching.

FIG. 6 is a diagram showing the results of the aforementioned study for the first 30 secs of streaming along with the TS bitrate as measured over 4 video frame intervals (~133 msecs which is close to the AFTimer interval of 120 msecs). The effect of low and high video production rates can be seen in the intervals between measurements as dictated by Table II; at low TS bitrates (250-500 kbps) in the first 6 secs of streaming, the intervals between measurements are long and on the order of 2-3 secs. At higher TS bitrates, the measurements occur more frequently.

Plot 604 ("bunch bitrate calc ignoring tcp_last_data_sent") results from application of the ΔT estimate of Eqn. (3) on 120 msec AFTimer intervals. Plot 608 ("bunch bitrate calc") is made using ΔT of Eqn. (4) taking into account tcpi_last_data_sent time. In general, the "bunch bitrate calc" method represented by plot 608 slightly overestimates the true bandwidth value of the "pcap bitrate over 128 k download" curve 606, but is closer than the "bunch bitrate ignoring tcpi_last_data_sent" curve 604. The latter curve can be seen to take the quantized values of Table I as expected. The overestimation of the "bunch bitrate calc" curve 608 likely results from lack of knowledge of when or whether the client 204 actually received the last data segments sent when the tcpi_last_data_sent parameter was read since the Wireshark-based calculations used the actual ACK response from the client 204 to calculate the DT.

The bunching algorithm's efficacy is limited, due to the variability in measurement intervals and the CPU loading required to move and buffer the bunched data.

Timer-Based Algorithm

In the previous algorithm design, measurement of the time at which the Gateway's TCP send socket buffer 238b emptied was investigated using the fixed AFTimer intervals of 120 msecs and/or the tcp_info parameter tcpi_last_data_sent. These mechanisms attempted to minimize the Gateway server 202 CPU use impact by performing operations only when other transcoder output buffer 232 (recpump) operations were performed and not more frequently. The Timer-Based Algorithm described below introduces a separate notification timer at, e.g., $T_{TB}$=10 msec intervals at which the measurement algorithm queries the send socket 238 through ioctl call SCIOUTQ for bytesRemaining=0. Here, however, the data are not bunched into blocks of N=131072 bytes, rather the data are allowed to flow from the transcoder 221 to the transcoder buffer 232 (recpump) and out to the TCP send socket buffer 238b as they are produced by the transcoder 221. Calculations for BW estimation are still made at AFTimer, $T_{AF}$=120 msec, intervals however, between AFTimer notifications, a repeated timer notifies the measurement algorithm every $T_{TB}$=10 msec to read the number of bytes remaining in the send socket buffer 238b (bytesRemaining). Let $N_{empty}$ be the number of 10 msec timer notifications that occur between AFTimer intervals at which bytesRemaining=0, i.e., when the socket buffer empties. There are two conditions that can occur here:

1) The send socket buffer 238b empties in $N_{empty}$<12 $T_{TB}$ sec timer notification intervals, i.e., the transcoder output buffer 232 (recpump) data is fully sent out the socket buffer 238 before the next AFTimer interval so bytesRemaining=0 at $N_{empty}*T_m$ secs past the last AFTimer.

2) Or, the TCP protocol state and network throughput are such that all of the last transcoder output buffer 232 (recpump) data block is not sent so that at the next AFTimer interval bytesRemaining 0.

Let socketBytesSent represent the number of data bytes in the transcoder output buffer 232 (recpump) data block that are sent to the TCP send socket buffer 238b in the Gateway server 202 at an AFTimer notification. Let bytesRemaining be the number of bytes reported to be left in the send socket buffer 238b at the current AFTimer expiration or after $N_{empty}$ $T_{TB}$ sec intervals when bytesRemaining=0. Let prevBytesRemaining be the number of bytes in the send socket buffer 238b at the previous AFTimer notification interval; prevBytesRemaining will equal 0 if all bytes were sent before the last AFTimer interval and nonzero if they weren't. Then the Timer-Based Algorithm makes bandwidth measurements at AFTimer intervals using the following calculations:

If (bytesRemaining=0)

$$BW = \frac{(prevBytesRemaining + socketBytesSent)*8}{N_{empty}T_{TB}} bps \quad \text{Equation (5)}$$

else if (bytesRemaining±0)

$$BW = \frac{\left(\begin{array}{c} prevBytesRemaining + \\ socketBytesSent - bytesRemaining \end{array}\right)*8}{T_{AF}} bps \quad \text{Equation (6)}$$

This technique was tested with different video bitrates and resolutions from the transcoder 221 through an Ethernet switch that enabled port rate shaping for limiting the maximum TCP throughput dynamically.

Figure 7:
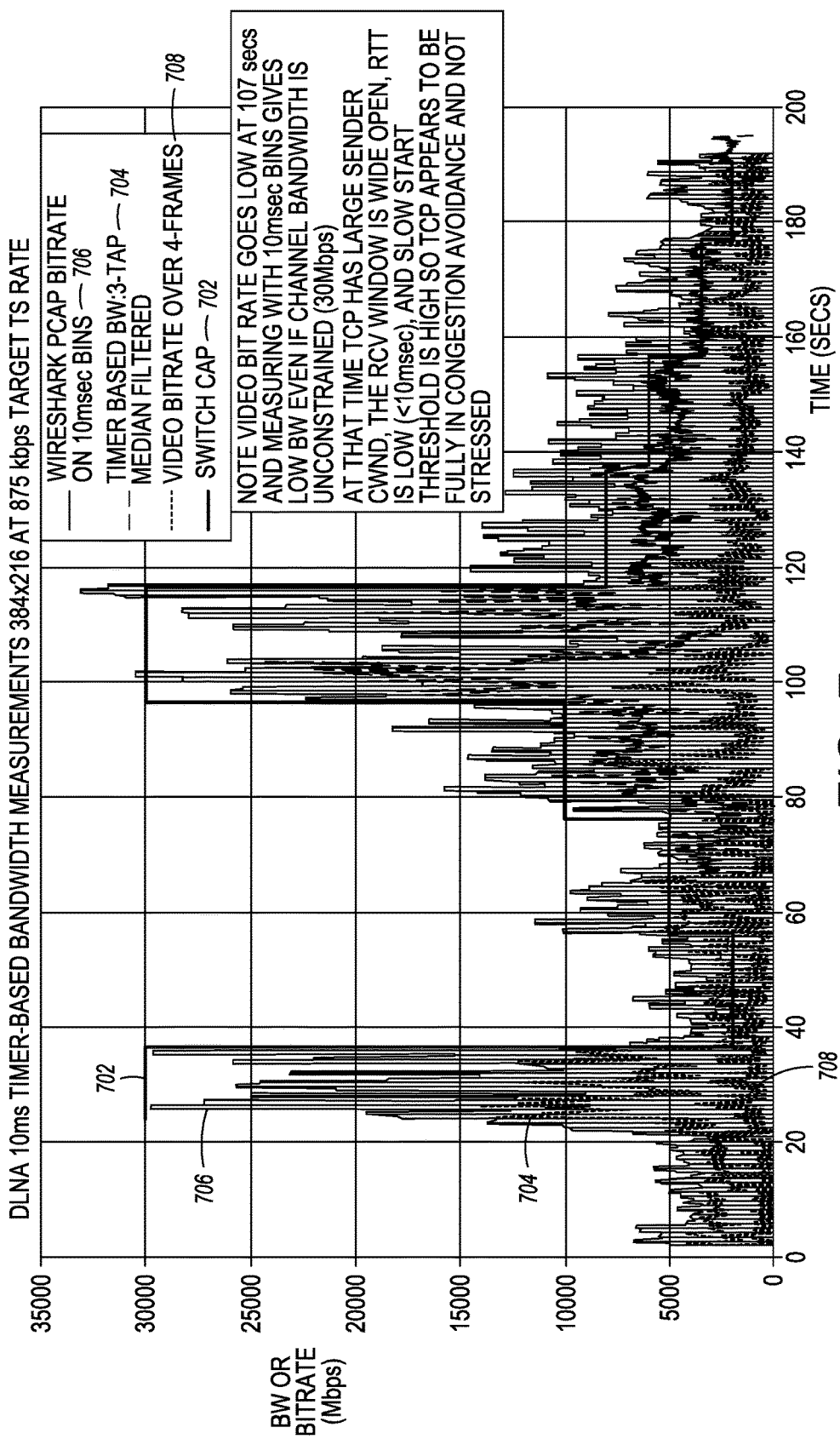
FIGS. 7 and 8 are plots showing a timer-based algorithm in operation for a VBR video stream.

FIG. 7 repeats the results in FIG. 3 without the plot of prior art CWND-based BW calculation of Equation. (1), showing the Timer-Based Algorithm in operation for a VBR 384×216p30 video stream carried in aggregate MPEG-2 TS at an average rate of 875 kbps. The network throughput was dynamically constrained using the Ethernet switch port rate shaping filter to vary from 30 Mbps to 2 Mbps, 5 Mbps, 10 Mbps, 30 Mbps, 8 Mbps, 6 Mbps, 3.5 Mbps and 2 Mbps at 20 sec intervals, as shown by the "Switch Cap" plot 702. The Timer-Based BW calculation was filtered using a 3-tap sliding window median filter to smooth variations. The "Timer based bw: 3-tap median filtered" curve 704 matches the trend of the "Switch Cap" curve 702 which represents the rate shaping filter caps. However, when low MPEG-2 TS bitrates occur during high channel capacity, e.g., at time t=110 secs when the switch capacity was 30 Mbps, the transcoder 221 periodically delivers only 5 to 10 kBytes of data to the transcoder output (recpump) buffer 232 every AFTimer interval of 120 msecs (e.g., at a rate of 5 kBytes× 8/0.12 secs=333 kbps). Given an Ethernet MSS of 1514 bytes, the data in the TCP send socket 238 will only be delivered over a few TCP segments every 120 msecs. These segments will be sent well within the 10 msec $T_{TB}$ timer interval yielding a quantization errored measurement of, e.g., BW=5 kBytes×8/(0.01 sec)=4 Mbps. This is verified in analysis of a Wireshark network capture of the TCP stream in which TCP segment deliveries are counted in 10 msec intervals shown in the "Wireshark pcap bitrate on 10 msec bins" curve 706 of FIG. 7. At t=110 secs the Wireshark analysis curve 706 matches closely the Timer Based BW curve. Plot 708 illustrates the video bitrate averaged over four frames.

Possible solutions for the problem of low offered load yielding BW measurement error for TTB intervals of 10 msecs include:

Lowering TTB to smaller values e.g., 7, 5 or 3 msecs. This will increase the CPU load for servicing many more notifications but will reduce the time inaccuracy in the denominator of Eqn (6).

Perform a slight Bunching Algorithm in which data are held in the recpump data buffer until a certain threshold is exceeded, e.g., 12.5 kbytes. If 12.5 kbytes are accumulated and released to the TCP send socket buffer 238b and TTB=10 msec timer notification intervals are used, then the maximum bit rate that would be measured for the minimum data block of 12.5 kBytes is BW=(12.5 kB)×8/0.01 s=10 Mbps.

For the purposes of controlling a video transcoder for mobile client video playback at bitrates less than 3.5 Mbps, a network BW measurement of 10 Mbps maximum is adequate and acceptable.

Figure 8:
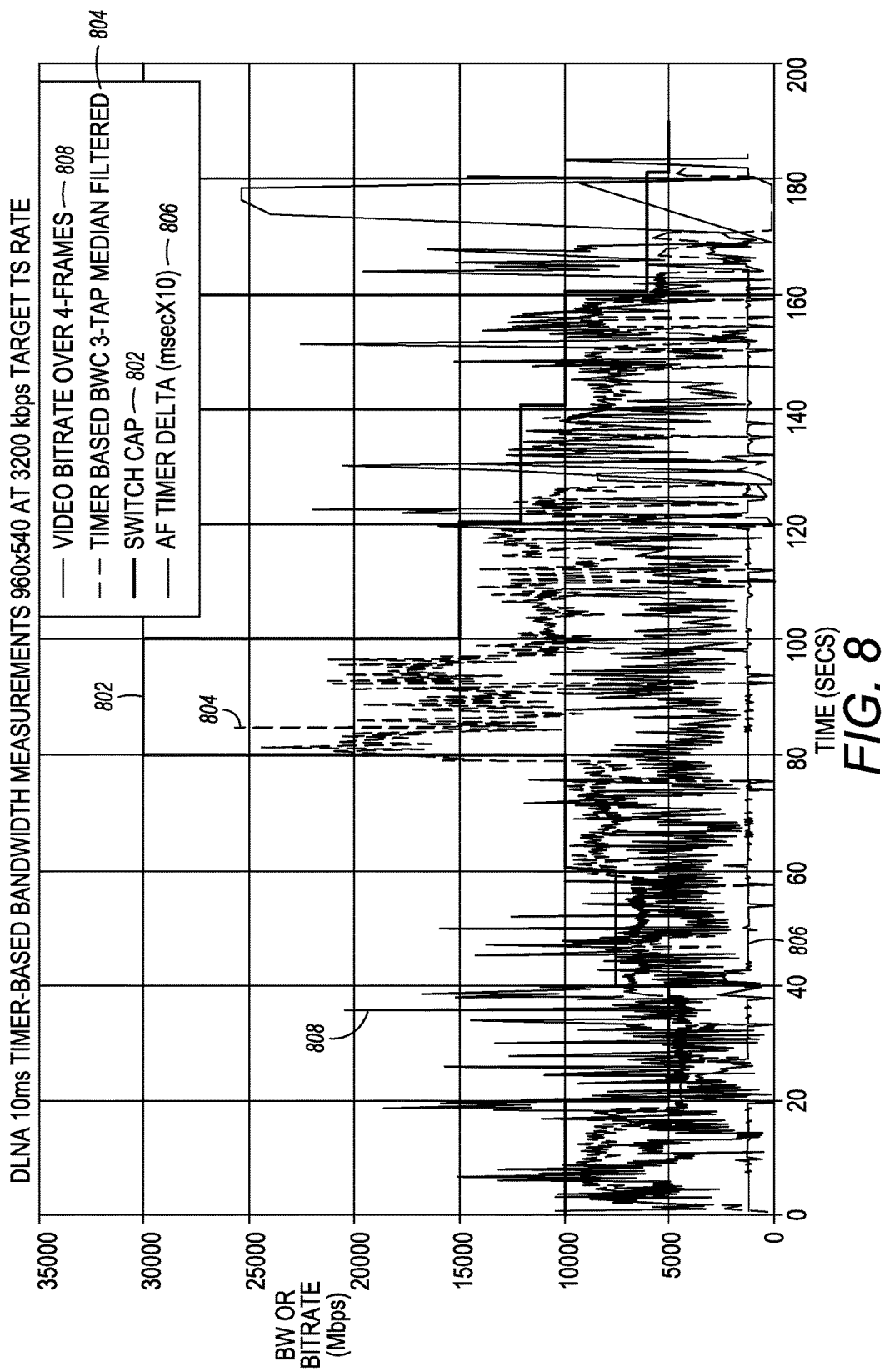

For higher MPEG-2 TS bit rate services, this time quantization error effect is not as frequent. FIG. 8 shows similar curves for a 960×540p30 VBR MPEG-2 TS AN stream at an average 3.2 Mbps bit rate. In this figure, the "Timer based bw: 3-tap median filtered" curve 804 more closely follows the trend of the "Switch Cap" curve 802 as the minimum TS bit rate is typically greater than 1-2 Mbps. In this test, a different problem was observed related to the high video bit rate seen in the "Video bitrate over 4-frames" curve 808 that exceeds the Switch Cap or maximum network bandwidth at various times. Here, there are periods where the TCP connection cannot deliver the data to the client 204 in time because the production rate exceeds the network capacity. The AFTimer intervals are noticeably longer as the TCP send socket buffer 238b does not empty between AFTimer notification intervals as shown in the "AFTimer delta (msec×10)" curve 806. Near the end of this test at t=170-180 secs, the client 204 was unable to download the media over the constrained network and playback failed. However, when the network capacity was at 30 Mbps at time t=80-100 secs, the measurement values mostly exceeded 10 Mbps.

Tcpi_last_ack_recv Algorithm

The tcpi_last_ack_recv algorithm makes use of the tcpi_last_ack_recv parameter returned in the tcp_info structure of the getsockopt call to the Linux stack. This parameter gives the system time at which the last TCP ACK was received by the gateway 202 TCP protocol. Similar to tcpi_last_data_sent, this parameter is used to calculate the elapsedTime for delivering a transcoder output buffer 232 (recpump) data block worth of media data over the TCP send socket 238 to the client 204. This value is used as illustrated in the next example to calculate an elapsedTime for TCP segment delivery.

Table III presents a TCP flowgraph was taken from a Wireshark capture of the startup of a DLNA media streaming session between the ABR server 202 at IP address 192.168.1.5 on port 7878 and the DLNA client at IP address 192.168.1.8 on port 52304. Alternating normal text and italicized, bolded text delineate the approximate sequential AFTimer intervals of duration 120 msecs. For example at the startup of the media delivery, 264 bytes have been delivered by time t=0.000000 secs as noted in the ACK Sequence Analysis column (Seq=264). The transcoder output buffer 232 (recpump) data block size at time t=0.0 is 1856 bytes which is delivered over the TCP socket in two segments; one of 1448 bytes and the other of 408 bytes. These are subsequently ACKed by the client 204 at time t=0.088535 secs. The next AFTimer interval begins 120 msecs later and it seen that the socket 238 delivers 768 bytes from the transcoder output buffer 232 (recpump) to the client 204 at time t=0.120447 secs which are ACKed at time t=0.124229 secs. Similarly at time t=0.480360 secs in the 5th AFTimer interval, the recpump block size is bytesSent=33472 bytes which are delivered to the client by the TCP protocol in a series of twenty-three 1448 bytes TCP segments and one 168 byte segment completed at time t=0.498158 secs and full ACKed at time t=0.505405 secs. The bandwidth estimation for this 5th transcoder output buffer 232 (recpump) block of data is made at the next AFTimer interval which happens at t=0.60 secs. The resulting tcpi_last_ack_recv value will be reported as $T_{lastACKrecv}$=0.60−0.505405=0.0946 secs which is the time delta from the current t=0.60 sec AFTimer notification time stamp to when the last ACK was received from the client 204. The elapsedTime is calculated as $$\text{elapsedTime} = T_{AF} - T_{lastACKrecv} = 0.120 - 0.0946 = 0.0254 \text{ secs.}$$

The corresponding TCP BW calculation can be made as:

$$BW = bytesSent*8/\text{elapsedTime bps}$$

which, for this example, yields:

$$BW = 33472*8/0.0254 = 10.5 \text{ Mbps}$$

TABLE III

| Time Stamp (secs) | Client IP Addr 192.168.1.8 | ABR Server IP Addr 192.168.1.5 | ACK Sequence Analysis |
|---|---|---|---|
| | (Port) | (Port) | |
| 0.000000 | ACK - Len: 1448 (52304) <------------------ (7878) | | Seq = 264 Ack = 397 |
| 0.000067 | PSH, ACK - Len: 408 | | Seq = 1712 Ack = 397 |

TABLE III-continued

| Time Stamp (secs) | Client IP Addr 192.168.1.8 | ABR Server IP Addr 192.168.1.5 | ACK Sequence Analysis |
|---|---|---|---|
| 0.088535 | (52304) <------------------ (7878) ACK | | Seq = 397 Ack = 2120 |
| *0.120447* | (52304) ------------------> (7878) *PSH, ACK - Len: 768* | | *Seq = 2120 Ack = 397* |
| *0.124229* | (52304) <------------------ (7878) *ACK* | | *Seq = 397 Ack = 2888* |
| 0.246443 | (52304) ------------------> (7878) PSH, ACK - Len: 1088 | | Seq = 2888 Ack = 397 |
| 0.248630 | (52304) <------------------ (7878) ACK | | Seq = 397 Ack = 3976 |
| *0.363219* | (52304) ------------------> (7878) *PSH, ACK - Len: 1152* | | *Seq = 3976 Ack = 397* |
| *0.365449* | (52304) <------------------ (7878) *ACK* | | *Seq = 397 Ack = 5128* |
| 0.480360 | (52304) ------------------> (7878) ACK - Len: 1448 | | Seq = 5128 Ack = 397 |
| 0.480457 | (52304) ------------------> (7878) ACK - Len: 1448 | | Seq = 6576 Ack = 397 |
| 0.480499 | (52304) ------------------> (7878) ACK - Len: 1448 | | Seq = 8024 Ack = 397 |
| 0.480551 | (52304) ------------------> (7878) ACK - Len: 1448 | | Seq = 9472 Ack = 397 |
| 0.480600 | (52304) ------------------> (7878) ACK - Len: 1448 | | Seq = 10920 Ack = 397 |
| 0.480647 | (52304) ------------------> (7878) ACK - Len: 1448 | | Seq = 12368 Ack = 397 |
| 0.480694 | (52304) ------------------> (7878) ACK - Len: 1448 | | Seq = 13816 Ack = 397 |
| 0.480743 | (52304) ------------------> (7878) ACK - Len: 1448 | | Seq = 15264 Ack = 397 |
| 0.480788 | (52304) ------------------> (7878) ACK - Len: 1448 | | Seq = 16712 Ack = 397 |
| 0.480835 | (52304) ------------------> (7878) ACK - Len: 1448 | | Seq = 18160 Ack = 397 |
| 0.489939 | (52304) <------------------ (7878) ACK | | Seq = 397 Ack = 8024 |
| 0.490022 | (52304) ------------------> (7878) ACK - Len: 1448 | | Seq = 19608 Ack = 397 |
| 0.490071 | (52304) ------------------> (7878) ACK - Len: 1448 | | Seq = 21056 Ack = 397 |
| 0.490115 | (52304) ------------------> (7878) ACK - Len: 1448 | | Seq = 22504 Ack = 397 |
| 0.490222 | (52304) <------------------ (7878) ACK | | Seq = 397 Ack = 10920 |
| 0.490282 | (52304) ------------------> (7878) ACK - Len: 1448 | | Seq = 23952 Ack = 397 |
| 0.490326 | (52304) ------------------> (7878) ACK - Len: 1448 | | Seq = 25400 Ack = 397 |
| 0.490370 | (52304) ------------------> (7878) ACK - Len: 1448 | | Seq = 26848 Ack = 397 |
| 0.490397 | (52304) <------------------ (7878) ACK | | Seq = 397 Ack = 13816 |
| 0.490448 | (52304) ------------------> (7878) ACK - Len: 1448 | | Seq = 28296 Ack = 397 |
| 0.490490 | (52304) ------------------> (7878) ACK - Len: 1448 | | Seq = 29744 Ack = 397 |
| 0.490528 | (52304) ------------------> (7878) ACK - Len: 1448 | | Seq = 31192 Ack = 397 |
| 0.491459 | (52304) <------------------ (7878) ACK | | Seq = 397 Ack = 16712 |
| 0.491535 | (52304) ------------------> (7878) ACK - Len: 1448 | | Seq = 32640 Ack = 397 |
| 0.491580 | (52304) ------------------> (7878) ACK - Len: 1448 | | Seq = 34088 Ack = 397 |
| 0.491627 | (52304) ------------------> (7878) ACK - Len: 1448 | | Seq = 35536 Ack = 397 |
| 0.498023 | (52304) <------------------ (7878) ACK | | Seq = 397 Ack = 19608 |
| 0.498115 | (52304) ------------------> (7878) PSH, ACK - Len: 1448 | | Seq = 36984 Ack = 397 |
| 0.498158 | (52304) ------------------> (7878) PSH, ACK - Len: 168 | | Seq = 38432 Ack = 397 |
| 0.498185 | (52304) <------------------ (7878) ACK | | Seq = 397 Ack = 22504 |
| 0.498378 | ACK | | Seq = 397 Ack = 25400 |
| 0.498468 | (52304) ------------------> (7878) ACK | | Seq = 397 Ack = 28296 |
| 0.498495 | (52304) ------------------> (7878) ACK | | Seq = 397 Ack = 31192 |
| 0.498546 | (52304) ------------------> (7878) ACK | | Seq = 397 Ack = 34088 |
| 0.500783 | (52304) ------------------> (7878) ACK | | Seq = 397 Ack = 36984 |
| 0.504825 | (52304) ------------------> (7878) ACK | | Seq = 397 Ack = 38432 |
| 0.505405 | (52304) ------------------> (7878) ACK | | Seq = 397 Ack = 38600 |
| *0.605532* | (52304) <------------------ (7878) *ACK - Len: 1448* | | *Seq = 38600 Ack = 397* |
| *0.605594* | (52304) <------------------ (7878) *ACK - Len: 1448* | | *Seq = 40048 Ack = 397* |
| *0.605658* | (52304) <------------------ (7878) *ACK - Len: 1448* ... | | *Seq = 41496 Ack = 397* |

A slight refinement to the elapsedTime calculation improves the measurement slightly. In the implementation of AFTimer notification, there can be small delays due to CPU process loading so the time delta between AFTimer notifications can have a small variance up to a few 10s of msecs from the desired 120 msec value. This error is corrected by making system time calls at the AFTimer notification interval to set the currentTime variable. When the bandwidth calculation has completed, then the variable lastSendTime is set to the currentTime value. Thus, lastSendTime represents the previous instant at which recpump data were delivered to the send socket buffer 238b while currentTime represents the time at which the latest AFTimer expired and recpump data were delivered to the socket.

Under the assumption that when bytesRemaining in the TCP socket equals zero, the data have been delivered over the socket and ACKed by the receiver (as in the above example of the 5th AFTimer calculation), the elapsed time is calculated as If (bytesRemaining=0):

$$elapsedTime = currentTime - lastSendTime - T_{lastACKrecv} \quad \text{Eqn. (7)}$$

and if the bytesRemaining are nonzero, then the tcpi_last_ack_recv value is indeterminate as to which delivered segment it represents and elapsed time will be equal to the AFTimer duration $T_{AF}$ as corrected here:

If (bytesRemaining !=0):

$$elapsedTime = currentTime - lastSendTime \quad \text{Eqn. (8)}$$

A running tally of the bytes taken by the socket send buffer is maintained in the variable bytesTakenBySocket as in Eqn (6) above:

bytesTakenBySocket=prevBytesRemaining+socketBytesSent

Thus, for this algorithm the complete BW calculation is now made as:

$$BW = \frac{(bytesTakenBySocket - bytesRemaining) \cdot 8}{elapsed\ time} bps \quad \text{Eq (9)}$$

The tcpi_last_ack_recv algorithm is incorporated in the current Gateway server-side ABR control algorithm as the network bandwidth measurement method described below.

Bandwidth Measurement Conditioning

The BW measurements made by the above algorithms on AFTimer intervals exhibit some variations and inaccuracies depending on media stream bit rate and network capacity. First, the raw BW value is capped to a maximum of 10 Mbps as:

$$\text{clampedBW} = \max(\text{BW}, 10 \text{ Mbps}) \quad \text{Eqn. (9)}$$

This cap is chosen since, in the transcoder control algorithm described below, the transcoder MPEG-2 TS output bit rate is set to 40% of the conditioned bandwidth measurement so as to allow network capacity overhead to ensure delivery of the media stream with minimal chance for client buffer underrun and stalling. Since the maximum TS bitrates used in the present application are less than 4 Mbps, the BW measurements need never be signaled at values greater than 4 Mbps/0.4=10 Mbps.

Second, for this implementation, the raw tcpi_last_ack_recv BW measurements are filtered using an N-tap, sliding window median filter. Below a 5-tap median filter was found to give good results; in the normal operation this filter spans five AFTimer interval BW measurements which for $T_{AF}=120$ msecs, gives a 600 msec filter support. Given the clamped bandwidth measurement at AFTimer instance k is denoted clampedBW$_k$ where k is an integer index, and the function $\text{Median}(X_n:X_{n+N-1})$ as the median of N real numbers from n to n+N−1, then the final conditioned bandwidth values, conditionedBW$_k$, values are given by:

$$\text{conditionedBW}_k = \text{Median}(\text{clampedBW}_{k-N+1}:\text{clampedBW}_K) \quad \text{Eqn. (10)}$$

Bit Rate and Resolution Control

Video, Audio, and HLS Constraints and Considerations

Once the network BW measurements are obtained, there remains the problem of determining the optimal transcoding parameters to be selected, and commanding the transcoder and media segment creator 220 to transcode the mezzanine recordings according to those parameters. This function is performed by the transcoder ABR and resolution controller 218.

In determining the transcoder commands, it is essential to consider the transcoded media and stream formats. For DLNA streaming and other mobile applications, AVC/H.264 video compression algorithms may be employed and for which input mezzanine video coded in MPEG-2 or AVC compression formats may be transcoded to AVC in progressive mode usually at 30 frames/sec (fps). In HLS streams, audio may be assumed to be input to the transcoder in AAC or AC-3 formats and transcoded to stereo HE-AACv1 or v2 at typically slightly less than 64 kbps bit rate. The following considerations may apply to one such server-side ABR implementation:

Changes to the transcoder 221 resolution settings are made only on Instantaneous Decoder Refresh (IDR) slice boundaries. IDRs might typically be spaced 1 to 2 seconds apart in an HLS media stream.

Total media transport stream bit rate should be less than the measured network bandwidth by some margin to increase the probability that the MPEG-2 stream downloads in sufficient time that the input buffer of the decoder buffer at the client 204 does not underrun during playback. For APPLE clients that incorporate DLNA-to-HLS proxy, players have been noted to begin playback with as little as 2 seconds of media data buffered, and this relatively small amount of buffered data means a server-side bit rate control algorithm needs to react very quickly to changes in the bandwidth of the communications channel of the network used to transmit the information.

Dynamic transcoder changes should be constrained in time. Making changes to video bit rate commands too frequently can cause transcoder rate control issues and, as well, can result in rapidly changing video quality of experience to the end user. Similarly making frequent and/or large video resolution changes should be avoided if possible.

Bit Rate and Resolution Control Implementation

Figure 9:
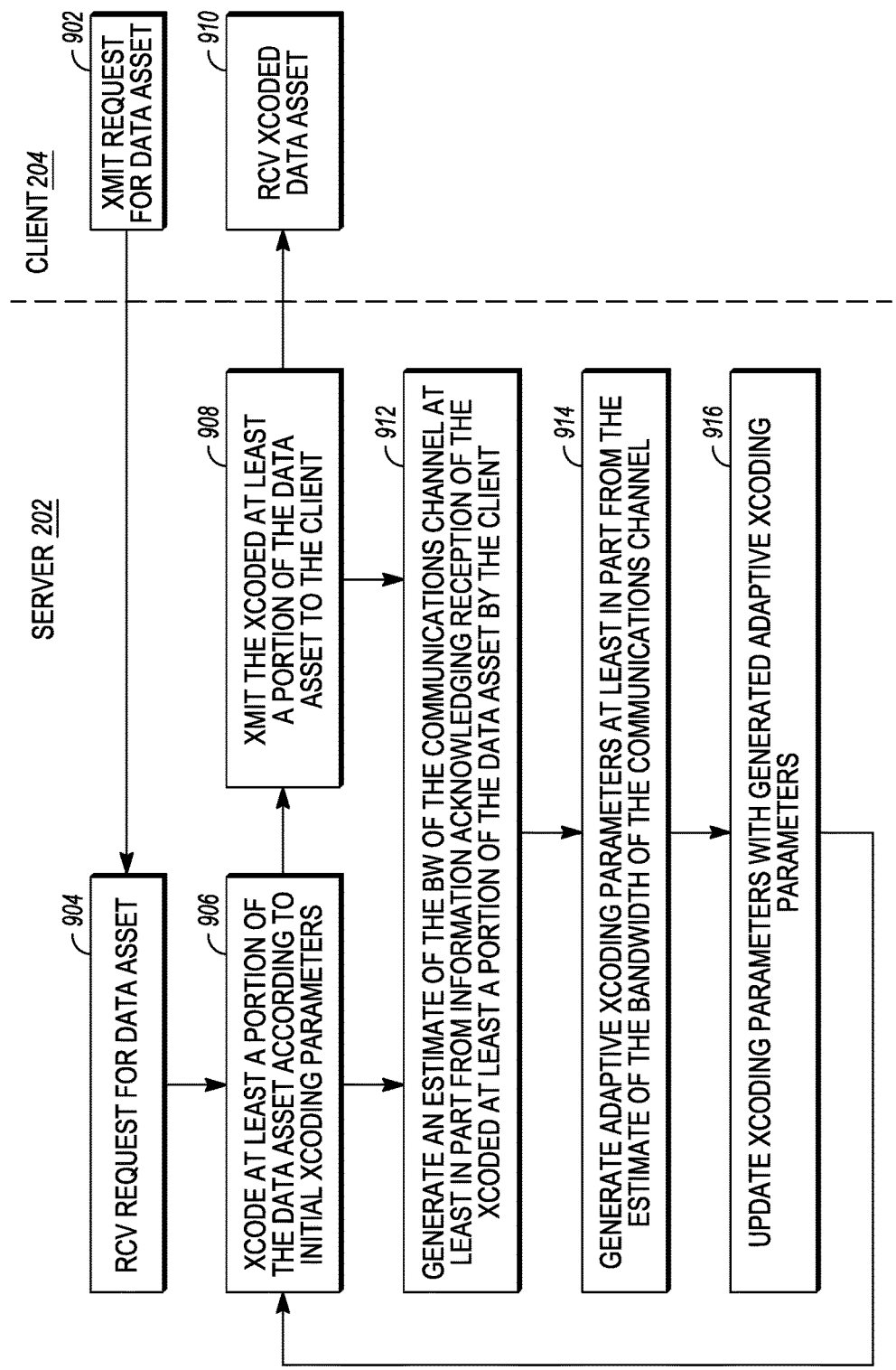
FIG. 9 is a diagram depicting exemplary operations for performing bit rate resolution and control.

FIG. 9 is a diagram depicting exemplary operations for performing bit rate resolution and control. FIG. 9 will be discussed with reference to FIG. 10, which depicts an embodiment of an apparatus for performing such operations, including more detailed representation of the content media server and bandwidth measurement module 216 and transcoder adaptive bit rate and resolution controller 218 depicted in FIG. 2.

Referring first to block 902, the client transmits a request for a data asset to the server 202. The server 202 receives the request for the data asset and begins transcoding at least a portion of the media asset according to one or more initial transcoding parameters, as shown in blocks 904 and 906. The server 202 then transmits the transcoded at least a portion of the data asset to the client over the communications channel, where it is received, as shown in blocks 908 and 910.

While such transmission is taking place, the server 202 generates an estimate of the bandwidth of the communications channel, at least in part from information acknowledging reception of the transcoded at least a portion of the data asset by the client, as shown in block 912. This can be performed, for example, by the bandwidth estimator 1002 illustrated in FIG. 10. The bandwidth estimator 1002 of the bandwidth measurement module 216 accepts communications channel bandwidth estimation information (which may include, for example, information acknowledging reception of the transcoded data, information describing now much data was sent over a particular interval, as well as timer and clock information), and generates an estimate of the bandwidth of the communications channel from the bandwidth estimation information.

In one embodiment, the bandwidth estimate is generated at least in part according to a round trip time (RTT) of the transmitted transcoded at least a portion of the data asset and a size of the transmitted transcoded at least a portion of the data asset. The RTT may be the elapsed time between commencement of the transmission of the transcoded at least a portion of the data asset and receiving an acknowledgement of the reception of the transcoded at least a portion of the data asset (e.g. the receipt of an ACK message).

As described herein the bandwidth estimate may be computed at a timer event (such as the AFTimer event described above) temporally separated from a previous timer event by a timer interval $T_{AF}$. In such case, the elapsed time between commencement of the transmission of the transcoded at least a portion of the data asset and receipt of the acknowledgement that the transcoded at least a portion of the data asset by the receiver can be computed as $T_{AF} - T_{lastACKrecv}$ wherein $T_{lastACKrecv}$ is the time between a clock time of the most recent acknowledgement of the reception of the transcoded at least a portion of the data asset and a clock time of the most recent timer event.

In another embodiment, the elapsed time between commencement of the transmission of the transcoded at least a portion of the data asset and receipt of the acknowledgement of the reception of the transcoded at least a portion of the data asset can be computed as:

$$\text{currentTime} - \text{lastSendTime} - T_{lastACKrecv}$$

if DataRemaining is zero, and $$\text{currentTime} - \text{lastSendTime}$$

if DataRemaining is nonzero. The variable currentTime is a clock time at which the most recent expiration of the timer interval and lastSendTime is a clock time at which the transcoded at least a portion of the data asset was delivered to the TCP send socket buffer 238b.

The amount of transcoded data (of the at least a portion of the data asset) may be determined according to prevDataRemaining+socketDataSent−DataRemaining wherein socketDataSent is an amount of the data asset delivered to a TCP send socket buffer of the server at the timer event (analogous to the socketBytesSent value discussed above), DataRemaining is an amount of unsent data asset remaining in the TCP send socket at an timer interval immediately after the timer event (analogous to the bytesRemaining value discussed above), and prevDataRemaining is an amount of the data asset remaining in the TCP send socket buffer after a previous timer interval (analogous to the prevBytesRemaining value discussed above).

The generated bandwidth estimate may be further processed before being used to command the transcoder 221. First, the bandwidth estimate can be clamped by limiter 1003. This limits the estimated bandwidth to a value which can be selected to prevent bandwidth estimates from exceeding a particular value that the communications channel bandwidth is not expected to exceed. This prevents unreasonable bandwidth estimates. The clamping value may be pre-selected or estimated, and may be fixed or change over time. In the exemplary embodiment described below, the bandwidth estimate can be clamped to 10 Mbps, for example.

Next, the clamped raw communications channel bandwidth may be filtered by filter module 1004. The filter module 1004 smoothes the bandwidth estimates so that the commands provided to the transcoder 221 more accurately represent longer term changes in communication channel bandwidth, rather than other sources. For example if changes in the actual communication bandwidth have a particular spectral content, the filter module may filter the estimated communication channel bandwidth to eliminate values inconsistent with that spectral content. Typically, the filter 1004 is a digital low pass filter. For example, in the embodiment described further below, the filter 1004 comprises a finite impulse response filter such as a sliding-window 5-tap median filter, however, other filter types may be used, such as infinite impulse response (IIR) filters using negative feedback, or optimal filters (for example, Kalman filters) that adaptively provide state and noise estimates. The output of filter 1004 is a filtered version of the clamped bandwidth estimate.

The filtered clamped bandwidth estimate may be provided to a scaler 1006, which scales the filtered, clamped bandwidth estimate by a scalar value. In the embodiment below, the scalar value is selected to be 0.4, thus providing a transcoder 221 bit rate command of 40% of the filtered and clamped estimated bandwidth estimate. The scalar value may also adaptively change based on system conditions.

Figure 10:
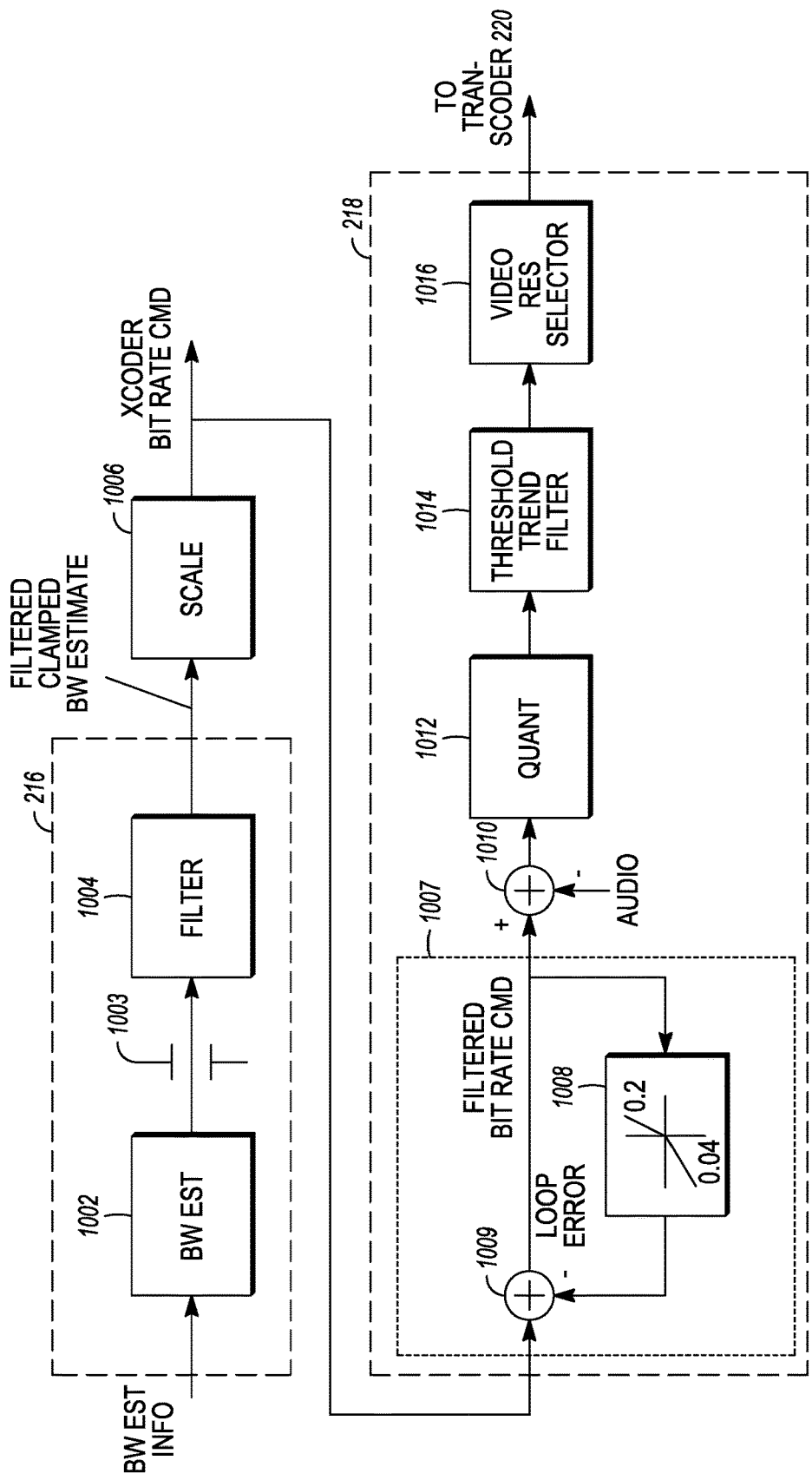
FIG. 10 is a diagram depicting an embodiment of an apparatus for performing bit rate resolution and control.

Returning to FIG. 9, in block 914, adaptive transcoding parameters are generated at least in part from the estimate of the bandwidth of the communications channel described above in block 912. This may be accomplished by the transcoder adaptive bit rate and resolution control module 219 as shown in FIG. 10. First, the transcoder bit rate command derived from the communications link bandwidth estimate may be low pass filtered. This can be accomplished by loop filter 1007 illustrated in FIG. 10. In one embodiment, the loop filter 1007 is a first order feedback control loop, wherein the filtered bit rate command is multiplied by a loop error gain value by loop feedback gain module 1008, and subtracted from the bit rate command by a loop error accumulator 1009 to generate a loop error value. The loop filter 1007 causes the bit rate commands to the transcoder 221 to increase and decrease more slowly than would otherwise be the case. In one embodiment, the loop filter gain module implements a 0.2 scalar gain if the filtered bit rate command is positive, and an 0.04 scalar gain if the filtered bit rate command is negative, as further described below. In this case, the transcoder bit rate command is asymmetrically filtered to permit more rapid decreases in the transcoder bit rate command than increases in the transcoder bit rate command.

Optional subtractor 1010 removes the fixed audio elementary stream bit rate from the output of the loop filter (the filtered bit rate command). The resulting video stream bit rate command is then quantized by quantizer module 1012 to prevent spurious transcoder commands 220. Details of the quantization levels corresponding to particular filtered bit rate commands are discussed further in the detailed implementation presented below.

The quantized bit rate command may then be optionally processed by a thresholding trend filter 1014. The thresholding trend filter prevents transcoder 220 "thrashing" by slowing the frequency of changes in the transcoder 220 bit rate commands. In one embodiment, the trend filter 1014 holds changes in the transcoder bit rate command until at least N consecutive increases in the bit rate command are provided to the trend threshold filter 1014. This defers increases in the output bit rate command until each of N successive output bit rate commands is greater than the previous output bit rate command, thus slowing the rise in transcoder bitrate command when communication channel conditions return to higher bandwidth from lower bandwidth conditions.

Finally, the thresholded and quantized bit rate command may also be optionally processed by a video resolution selector 1016. The video resolution selector 1016 selects a video resolution based on the bit rate commands as further described below.

Returning again to FIG. 9, the transcoding parameters used by the transcoder are updated with the generated adaptive transcoding parameters (for example, the bit rate command and video resolution generated above), as shown in block 916, and these updated transcoding parameters are used to transcode at least a further portion of the data asset, which is transmitted by the server 202 and received by the client 204 as shown again in blocks 906-910.

Pseudocode of Bit Rate and Resolution Control Implementation

Figure 11:
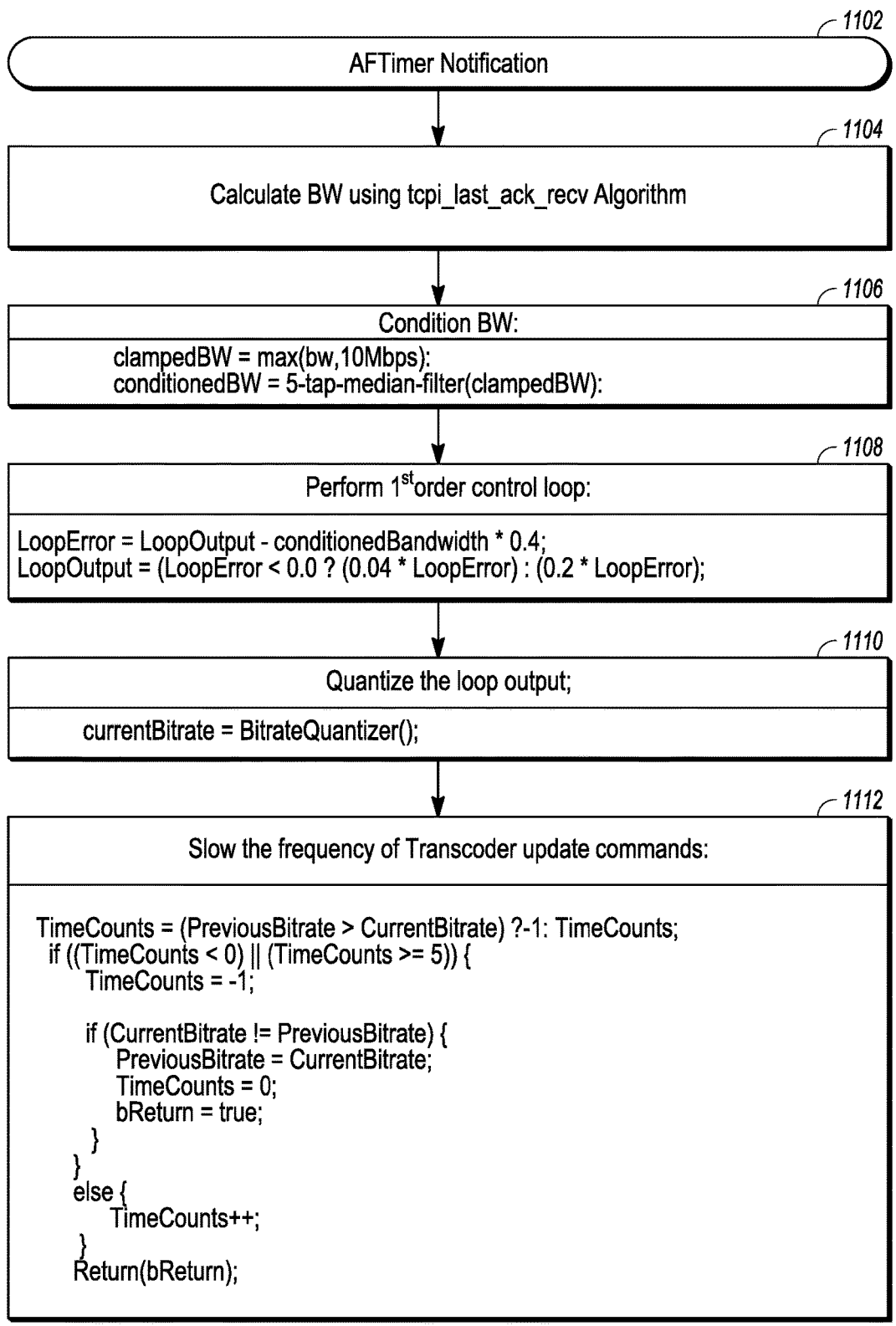
FIG. 11 is a diagram illustrating a pseudocode implementation of a server-side ABR video bit rate and resolution control algorithm.
Figure 13:
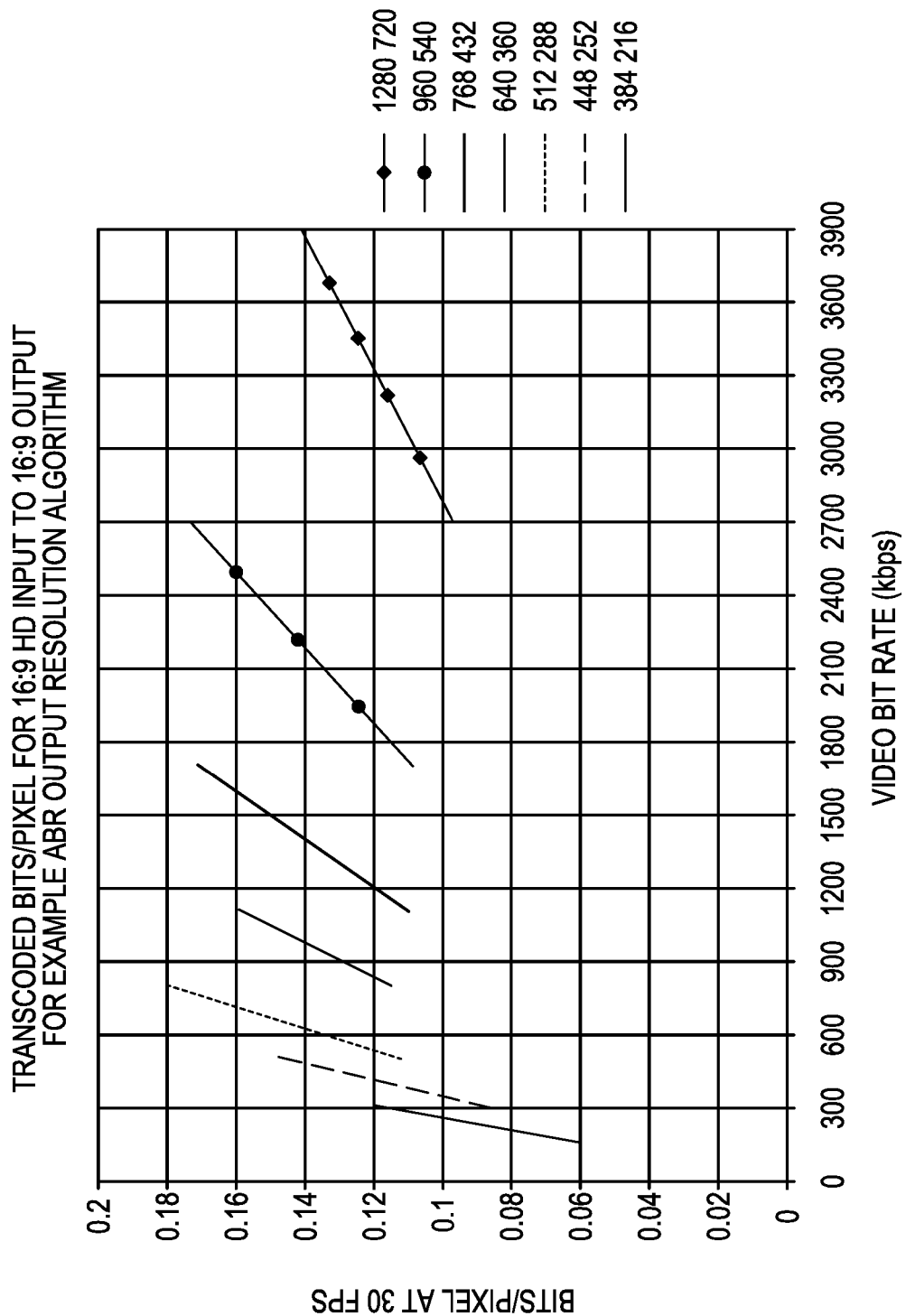
FIG. 13 is a diagram showing coded video bits per pixel for various aspect ratios and video resolutions versus video coded bit rate.

FIG. 11 is a diagram illustrating an pseudocode implementation of a server-side ABR video bit rate and resolution control algorithm. For this implementation, the following mechanisms were utilized:

1. At AFTimer notification intervals every $T_{AF}$=120 msecs or longer (1102), the tcpi_last_ack_recv BW measurement algorithm described above is used to generate an estimate of the raw TCP network BW (throughput or goodput), as shown in block 1104.
2. In block 1106, the raw bandwidth value is clamped to 10 Mbps and then filtered by a sliding-window 5-tap median filter.
3. In block 1108, a first order feedback control loop is implemented to derive the transcoder MPEG-2 TS output bit rate based on the bandwidth measurements. In the illustrated embodiment, the overall MPEG-2 TS bit rate is targeted to 40% of the available network bandwidth as explained above; the LoopOutput then is driven to 40% of the filtered conditioned$BW_k$ values as detected by the LoopError variable which the loop drives to an average zero value. The loop has a nonlinear response so as to react slowly to increasing BW and rapidly to decreasing BW measurements. This is implemented by a LoopOutput accumulator that subtracts the LoopError value from its contents every loop update period. For one implementation, the first-order loop gain is 0.2 for positive LoopError values (driving LoopOutput, hence, transcoder bitrate lower) while 0.04 for negative LoopError (driving transcoder bitrate higher). Thus, the loop will slowly increase the commanded transcoder 220 bitrate when the channel capacity is high but react very quickly if the channel capacity drops suddenly and remains low.
4. In block 1110, the LoopOutput bitrate is then quantized by the BitRateQuantizer( ) function. This function computes the video transcoder target elementary stream (ES) bit rate from the LoopOutput by first subtracting the fixed Audio elementary stream bitrate from the LoopOutput (which represents total MPEG-2 target TS bitrate). In this implementation, the audio transcoder bit rate is not varied as part of the control algorithm, but other embodiments can incorporate audio bitrate control if desired. For this implementation, the video ES bitrate is quantized in a nonlinear manner such that for desired video ES bitrates below 600 kbps the steps are 100 kbps, for video ES bitrates between 600 and 1200 kbps the steps are 200 kbps, and for video ES bitrates from 1200 to 3500 kbps the steps are 300 kbps. This quantization makes use of the subjective and objective observations that video peak signal to noise ratio (PSNR) and quality rate-distortion curves rise rapidly at low bitrates to asymptotic flat values at high bitrate so quantization steps at low bit rates should be smaller than at higher bitrates. The use of such quantization also prevents the algorithm from "thrashing" the video transcoder with new rate control values every AFTimer interval. FIG. 12 is a diagram illustrating exemplary pseudocode to quantize the loop output.
5. In block 1112, further rate "thrashing" is prevented in a state machine that slows the frequency of transcoder update commands that increase the video bitrate. In this state machine, if the new calculated bitrate, CurrentBitrate is less than the previously calculated bitrate, PreviousBitrate, the bReturn value is set to TRUE to signal that an immediate transcoder command should be made to lower the transcoder bit rate (in response to a dropping network bandwidth and channel capacity). However, if the PreviousBitrate is smaller than the CurrentBitrate signaling detection of increasing network bandwidth, the transcoder control is held off until at least 6 consecutive such conditions are encountered. This slows the rise in transcoder bitrate when the network conditions return from low capacity to high capacity.
6. The commanded video elementary stream bit rate, CurrentBitrate, is further conditioned to determine a desired video resolution. FIG. 13 shows the coded video bits per pixel (CVBPS) for various 16:9 aspect ratio video resolutions versus video coded bit rate at 30 fps. For H.264/AVC encoding it is well known that 720p60 compressed sequences achieve good quality at a coded bit rate of about 6 Mbps and higher. Applying a linear scaling for 30 fps implies that good 720p30 quality should be achievable at 3 Mbps. This represents CVBPS=(3 Mbps)/(1280×720 pixels/frame)/30 fps=0.11 coded-bits/pixel. Thus, for a given target video bit rate, it might be desired to choose a video resolution that maintains a CVBPS of around 0.11. FIG. 11 shows the video resolution values chosen for a given video bit rate command to the transcoder element. For example, if the algorithm in step 5 above determines the necessary video bit rate, CurrentBitrate, lies between 1700 kbps and 2700 kbps, the video resolution is set to qHD at 1060×540 pixels but if the desired video bit rate is between 500 and 800 kbps, the resolution is set to 512×288.

In the above implementation, all of the threshold and gain values are settable and can be chosen to give a desired transcoder video bitrate control experience. Experimentation with these thresholds led to reasonable results with the described values but more extensive testing is needed to tune the algorithm.

Figure 14:
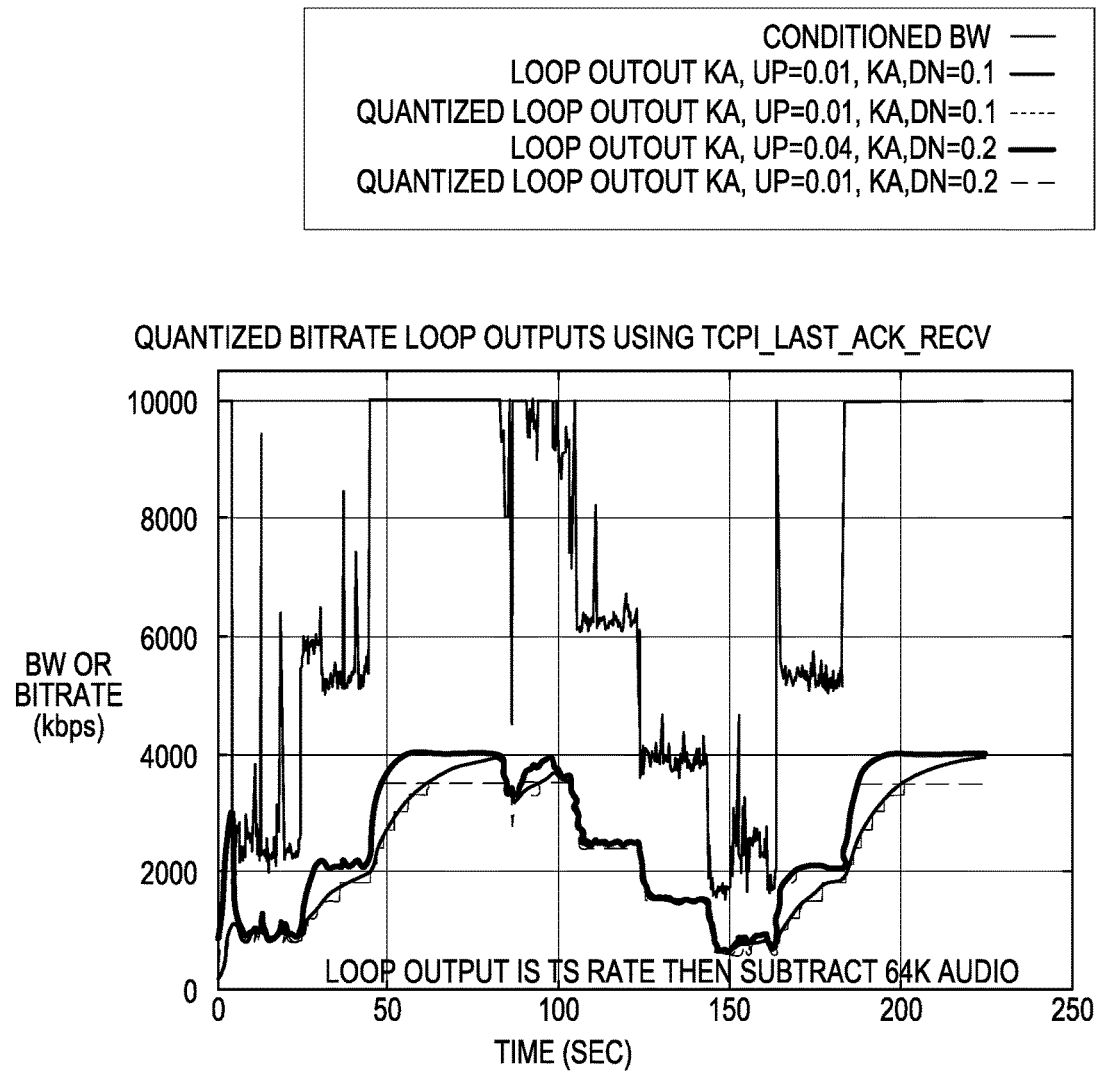
FIG. 14 shows an example of the performance for two different sets of loop gain parameters used in a server-side ABR algorithm.

FIG. 14 shows an example of the performance for two different sets of loop gain parameters used in the server-side ABR algorithm described above. BW measurements based on the tcpi_last_ack_recv algorithm were put the measurement conditioning and then into loop instances having nonlinear loop gain pairs of (0.2, 0.04) representing quicker response and (0.1, 0.01) slower response. The GW ABR server Ethernet output was dynamically throttled to values varying every 20 secs from 2 to 5, 10, 30, 8, 6, 4, 2, 5 Mbps as the test progressed. The curves labeled "Loop output ka,up ka,dn" show the loop output before the BitRateQuantizer( ) function is applied while the curves labeled "Quantized loop output, ka,up ka,dn" show the output after BitRateQuantizer( ) has been applied. It can be seen that low loop gains ka,up=0.01 and ka,dn=0.1 result in very slow increase in transcoder bit rate when channel capacity increases, taking over 30 secs to achieve the max capped rate of 4 Mbps used in this test example at high network capacity.

Hardware Environment

Figure 15:
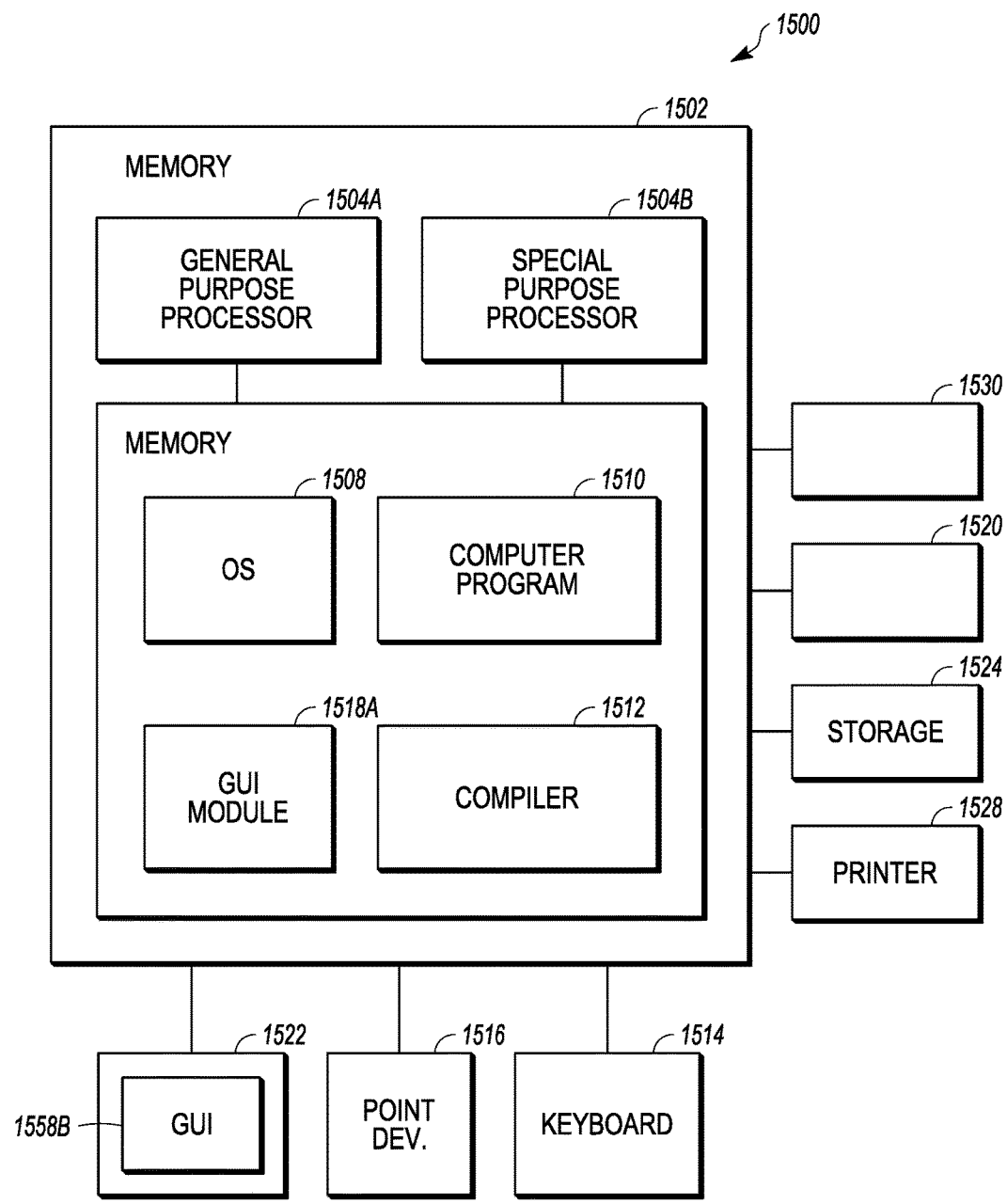
FIG. 15 is a diagram illustrating an exemplary computer system that could be used to implement elements of the present invention.

FIG. 15 is a diagram illustrating an exemplary computer system 1500 that could be used to implement elements of the present invention, including the ABR server 202, client 204, and elements thereof. The computer 1502 comprises a general purpose hardware processor 1504A and/or a special purpose hardware processor 1504B (hereinafter alternatively collectively referred to as processor 1504) and a memory 1506, such as random access memory (RAM). The computer 1502 may be coupled to other devices, including input/output (I/O) devices such as a keyboard 1514, a mouse device 1516 and a printer 1528.

In one embodiment, the computer 1502 operates by the general purpose processor 1504A performing instructions defined by the computer program 1510 under control of an operating system 1508. The computer program 1510 and/or the operating system 1508 may be stored in the memory 1506 and may interface with the user and/or other devices to accept input and commands and, based on such input and commands and the instructions defined by the computer program 1510 and operating system 1508 to provide output and results.

Output/results may be presented on the display 1522 or provided to another device for presentation or further processing or action. In one embodiment, the display 1522 comprises a liquid crystal display (LCD) having a plurality of separately addressable pixels formed by liquid crystals. Each pixel of the display 1522 changes to an opaque or translucent state to form a part of the image on the display in response to the data or information generated by the processor 1504 from the application of the instructions of the computer program 1510 and/or operating system 1508 to the input and commands. Other display 1522 types also include picture elements that change state in order to create the image presented on the display 1522. The image may be provided through a graphical user interface (GUI) module 1518A. Although the GUI module 1518A is depicted as a separate module, the instructions performing the GUI functions can be resident or distributed in the operating system 1508, the computer program 1510, or implemented with special purpose memory and processors.

Some or all of the operations performed by the computer 1502 according to the computer program 1510 instructions may be implemented in a special purpose processor 1504B. In this embodiment, some or all of the computer program 1510 instructions may be implemented via firmware instructions stored in a read only memory (ROM), a programmable read only memory (PROM) or flash memory within the special purpose processor 1504B or in memory 1506. The special purpose processor 1504B may also be hardwired through circuit design to perform some or all of the operations to implement the present invention. Further, the special purpose processor 1504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1502 may also implement a compiler 1512 which allows an application program 1510 written in a programming language such as COBOL, C++, FORTRAN, or other language to be translated into processor 1504 readable code. After completion, the application or computer program 1510 accesses and manipulates data accepted from I/O devices and stored in the memory 1506 of the computer 1502 using the relationships and logic that was generated using the compiler 1512.

The computer 1502 also optionally comprises an external communication device such as a modem, satellite link, Ethernet card, or other device for accepting input from and providing output to other computers.

In one embodiment, instructions implementing the operating system 1508, the computer program 1510, and/or the compiler 1512 are tangibly embodied in a computer-readable medium, e.g., data storage device 1520, which could include one or more fixed or removable data storage devices, such as a zip drive, floppy disc drive 1524, hard drive, CD-ROM drive, tape drive, or a flash drive. Further, the operating system 1508 and the computer program 1510 are comprised of computer program instructions which, when accessed, read and executed by the computer 1502, causes the computer 1502 to perform the steps necessary to implement and/or use the present invention or to load the program of instructions into a memory, thus creating a special purpose data structure causing the computer to operate as a specially programmed computer executing the method steps described herein. Computer program 1510 and/or operating instructions may also be tangibly embodied in memory 1506 and/or data communications devices 1530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1502.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

A Gateway server Adaptive Bit Rate transcoder control algorithm has been described for DLNA media streaming applications. Multiple server-side network bandwidth measurement algorithms were described and an implementation of transcoder video bit rate control using one of those algorithms was designed and tested. Further testing on live networks will result in tuning of the parameters and thresholds built into the control algorithm.

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of adaptively transmitting streaming video data to a media video player client, comprising:
   receiving, in a server, a request for a video data asset from the media video player client;
   transcoding in the server a portion of the video data asset according to initial transcoding parameters;
   transmitting the transcoded portion of the video data asset from the server to the client over a communication channel;
   generating in the server an estimate of a bandwidth of the communications channel at from information acknowledging reception of the transcoded portion of the data asset by the client;
      wherein the bandwidth estimate is generated according to a round trip time (RTT) of the transmitted transcoded portion of the data asset and a size of the transmitted transcoded portion of the data asset, wherein the RTT is the elapsed time between commencement of the transmission of the transcoded portion of the video data asset and receipt of the acknowledgement of the reception of the transcoded portion of the video data asset;

generating adaptive transcoding parameters from the estimate of the bandwidth of the communications channel, the estimate generated at the server;

transcoding a temporally subsequent further portion of the video data asset according to the adaptive transcoding parameters; and transmitting the further portion of the data asset from the server to the client, wherein the bandwidth estimate is computed at a timer event temporally separated from a previous timer event by a timer interval $T_{AF}$, and the elapsed time between commencement of the transmission of the transcoded portion of the data asset and receipt of the acknowledgement of the reception of the transcoded portion of the data asset is computed as:

$$T_{AF} - T_{lastACKrecv};$$

wherein $T_{lastACKrecv}$ is the time between a clock time of the most recent acknowledgement of the reception of the transcoded portion of the data asset and a clock time of the most recent timer event.

2. The method of claim 1, wherein:
the amount of transmitted transcoded a portion of the video data asset is determined according to prevDataRemaining+socketDataSent−DataRemaining, wherein:

socketDataSent is an amount of the data asset delivered to a transmission control protocol (TCP) send socket buffer of the server at the timer event;

DataRemaining is an amount of unsent data asset remaining in the TCP send socket at an timer interval immediately after the timer event;

prevDataRemaining is an amount of the data asset remaining in the TCP send socket buffer after a previous timer interval.

3. The method of claim 2, wherein:
the elapsed time between commencement of the transmission of the transcoded a portion of the data asset and receipt of the acknowledgement of the reception of the transcoded a portion of the data asset is:

currentTime−lastSendTime−$T_{lastACKrecv}$ if DataRemaining is zero;

currentTime−lastSendTime if DataRemaining is non-zero; and wherein currentTime is a clock time at which the most recent expiration of the timer interval and lastSendTime is the clock time at which the transcoded a portion of the data asset was delivered to the TCP send socket buffer.

4. The method of claim 3, further comprising clamping the generated estimated bandwidth of the communications channel to a clamping value.

5. The method of claim 4, further comprising filtering the estimated bandwidth of the communication channel.

6. The method of claim 5, further comprising scaling the estimated bandwidth of the communication channel.

7. The method of claim 6, wherein generating adaptive coding parameters at least in part from the estimate of the bandwidth of the communications channel comprises:
generating a transcoder bit rate command according to the estimate of the bandwidth;

low pass filtering the transcoder bit rate command, wherein the transcoder output bit rate command is asymmetrically filtered to permit more rapid decreases in the transcoder bit rate command than increases in the transcoder bit rate command; and quantizing the low pass filtered transcoder output bit rate command.

8. The method of claim 7, wherein increases in the output bit rate command are deferred until each of N successive output bit rate commands is greater than the previous output bit rate command.

9. The method of claim 1, wherein:
the bandwidth estimate is computed at a timer event temporally separated from a previous timer event by a timer interval $T_{AF}$, and transmitting the transcoded portion of the data asset from the server to the client over a communication channel comprises:

sending a first fragment of the transcoded segment from a transcoder output buffer to a TCP send socket buffer at a timer event;

transmitting at least a portion of the first fragment of the transcoded segments from the TCP send socket buffer to the client over the communications channel;

generating an estimate of the bandwidth of the communications channel at least in part from information acknowledging reception of the transcoded segment of the data asset by the client comprises:

computing the estimate of the bandwidth at the timer interval $T_{AF}$ according to $$BW = \frac{(prevDataRemaining + socketDataSent)}{N_{empty} T_{TB}} \text{ if } dataRemaining = 0$$

and $$BW = \frac{\left(\begin{array}{c} prevDataRemaining + socketDataSent - \\ dataRemaining \end{array}\right)}{T_{AF}} \text{ if } dataRemaining \neq 0;$$

wherein:
socketDataSent represent an amount of data of the first fragment of the transcoded segments sent from the transcoder output buffer to the TCP send buffer at the timer interval;

dataRemaining represents an amount of data of the first fragment of the transcoded segments remaining in the TCP send buffer at the timer interval;

$N_{empty}$ represents a number of notification time intervals $T_{TB}$ between a most recent timer interval and a time when the remaining number of bytes in the TCP send socket buffer is zero; and previousDataRemaining represents an amount of data in the TCP send socket buffer at a temporally adjacently previous timer interval.

10. The method of claim 1, wherein the video player client is a DLNA HTTP streaming data receiving device.

11. An apparatus forming a server for transmitting streaming video data to a video media player client, comprising:
a processor, communicatively coupled to a memory, the memory storing processing instructions including processor instructions for:
receiving, in a server, a request for a data asset from the video player client;
transcoding a portion of the video data asset according to initial transcoding parameters;

transmitting the transcoded portion of the video data asset from the server to the video player client over a communication channel;
generating an estimate of a bandwidth of the communications channel from information acknowledging reception of the transcoded portion of the video data asset by the video player client;
  wherein the bandwidth estimate is generated according to a round trip time (RTT) of the transmitted transcoded portion of the data asset and a size of the transmitted transcoded portion of the video data asset, wherein the RTT is the elapsed time between commencement of the transmission of the transcoded portion of the video data asset and receipt of the acknowledgement of the reception of the transcoded portion of the video data asset;
generating adaptive transcoding parameters from the estimate of the bandwidth of the communications channel, the estimate generated at the server;
transcoding a temporally subsequent further portion of the video data asset according to the adaptive transcoding parameters; and
transmitting the further portion of the data asset from the server to the video player client, wherein
  the bandwidth estimate is computed at a timer event temporally separated from a previous timer event by a timer interval $T_{AF}$, and
  the elapsed time between commencement of the transmission of the transcoded a portion of the video data asset and receipt of the acknowledgement of the reception of the transcoded portion of the video data asset is computed as:

$$T_{AF} - T_{lastACKrecv}$$

wherein $T_{lastACKrecv}$ is the time between a clock time of the most recent acknowledgement of the reception of the transcoded portion of the video data asset and a clock time of the most recent timer event.

12. The apparatus of claim 11, wherein:
the amount of transmitted transcoded a portion of the data asset is determined according to prevDataRemaining+socketDataSent−DataRemaining, wherein:
socketDataSent is an amount of the data asset delivered to a transmission control protocol (TCP) send socket buffer of the server at the timer event;
DataRemaining is an amount of unsent data asset remaining in the TCP send socket at a timer interval immediately after the timer event; and
prevDataRemaining is an amount of the data asset remaining in the TCP send socket buffer after a previous timer interval.

13. The apparatus of claim 12, wherein:
the elapsed time between commencement of the transmission of the transcoded a portion of the data asset and receipt of the acknowledgement of the reception of the transcoded a portion of the data asset is:

currentTime−lastSendTime−$T_{lastACKrecv}$ if DataRemaining is zero;

currentTime−lastSendTime if DataRemaining is non-zero; and wherein currentTime is a clock time at which the most recent expiration of the timer interval and lastSendTime is the clock time at which the transcoded a portion of the data asset was delivered to the TCP send socket buffer.

14. The apparatus of claim 13, wherein the instructions further comprise:
instructions for clamping the generated estimated bandwidth of the communications channel to a clamping value; and
instructions for filtering the estimated bandwidth of the communication channel.

15. The apparatus of claim 14, wherein the instructions further comprise instructions for scaling the estimated bandwidth of the communication channel.

16. The apparatus of claim 15, wherein the instructions for generating adaptive coding parameters at least in part from the estimate of the bandwidth of the communications channel comprise instructions for:
generating a transcoder bit rate command according to the estimate of the bandwidth;
low pass filtering the transcoder bit rate command, wherein the transcoder output bit rate command is asymmetrically filtered to permit more rapid decreases in the transcoder bit rate command than increases in the transcoder bit rate command; and
quantizing the low pass filtered transcoder output bit rate command.

17. The apparatus of claim 10, wherein:
the bandwidth estimate is computed at a timer event temporally separated from a previous timer event by a timer interval $T_{AF}$;
the instructions for transmitting the transcoded portion of the data asset from the server to the client over a communication channel comprise instructions for:
  sending a first fragment of the transcoded segment from a transcoder output buffer to a TCP send socket buffer at a timer event;
  transmitting at least a portion of the first fragment of the transcoded segments from the TCP send socket buffer to the client over the communications channel;
the instructions for generating an estimate of the bandwidth of the communications channel at least in part from information acknowledging reception of the transcoded segment of the data asset by the client comprise instructions for:
  computing the estimate of the bandwidth at the timer interval $T_{AF}$ according to $$BW = \frac{(prevDataRemaining + socketDataSent)}{N_{empty}T_{TB}} \text{ if } dataRemaining = 0$$

and $$BW = \frac{\left(prevDataRemaining + socketDataSent - dataRemaining\right)}{T_{AF}} \text{ if } dataRemaining \neq 0;$$

wherein
  socketDataSent represent an amount of data of the first fragment of the transcoded segments sent from the transcoder output buffer to the TCP send buffer at the timer interval;
  dataRemaining represents an amount of data of the first fragment of the transcoded segments remaining in the TCP send buffer at the timer interval;
  $N_{empty}$ represents a number of notification time intervals $T_{TB}$ between a most recent timer interval and a time when the remaining number of bytes in the TCP send socket buffer is zero; and previousDataRemaining represents an amount of data in the TCP send socket buffer at a temporally adjacently previous timer interval.

18. The apparatus of claim 11, wherein the video player client is a DLNA HTTP streaming data receiving device.

* * * * *